(12) United States Patent
Yu

(10) Patent No.: US 7,589,289 B2
(45) Date of Patent: Sep. 15, 2009

(54) SOLID INSULATED DISCONNECTION SWITCH AND SOLID INSULATED SWITCHGEAR USING THE SAME

(75) Inventor: Lyun Yu, Chungcheongbuk-Do (KR)

(73) Assignee: LS Industrial Systems Co., Ltd., Seoul (KR)

( * ) Notice: Subject to any disclaimer, the term of this patent is extended or adjusted under 35 U.S.C. 154(b) by 329 days.

(21) Appl. No.: 11/739,125

(22) Filed: Apr. 24, 2007

(65) Prior Publication Data
US 2007/0261946 A1 Nov. 15, 2007

(30) Foreign Application Priority Data
May 11, 2006 (KR) ...................... 10-2006-0042659

(51) Int. Cl.
*H01H 31/02* (2006.01)
(52) U.S. Cl. ..................................... 200/48 R; 218/154
(58) Field of Classification Search ................ 200/1 R, 200/19.01, 19.05, 19.07, 19.18, 48 R, 501, 200/502, 253.1, 572; 218/7, 12, 14, 67, 78–80, 218/120, 140, 153, 154
See application file for complete search history.

(56) References Cited

U.S. PATENT DOCUMENTS

| | | | | |
|---|---|---|---|---|
| 3,801,768 A | * | 4/1974 | Meyer ..................... 200/253.1 |
| 4,808,777 A | * | 2/1989 | Kindberg et al. ............ 200/323 |
| 4,983,792 A | * | 1/1991 | Rogers et al. ................. 218/84 |
| 5,091,616 A | * | 2/1992 | Ramos et al. ................... 218/9 |
| 5,850,909 A | * | 12/1998 | Wagner ...................... 200/501 |
| 6,429,393 B1 | * | 8/2002 | Opfer et al. .................... 218/68 |
| 6,818,850 B2 | * | 11/2004 | Bridges ..................... 218/154 |
| 7,189,933 B2 | | 3/2007 | Yu | |

* cited by examiner

*Primary Examiner*—Elvin G. Enad
*Assistant Examiner*—Marina Fishman
(74) *Attorney, Agent, or Firm*—Greenblum & Bernstein, P.L.C.

(57) ABSTRACT

Disclosed are a solid-insulated disconnection switch and a solid-insulated switchgear using the same. The solid-insulated switchgear using the solid-insulated disconnection switch according to the present invention can have an eco-friendly characteristic and a small size by solid-insulating each unit, a disconnection switches and earth switch constituting each unit.

In the solid-insulated switchgear according to the present invention, each unit and each part constituting each unit are standardized so as to be interchangeable to each other, thereby implementing a simple manufacture.

Furthermore, the solid-insulated switchgear can be manufactured according to an installation environment and a user's various demands, and can have an enhanced maintenance/repair characteristic.

16 Claims, 21 Drawing Sheets

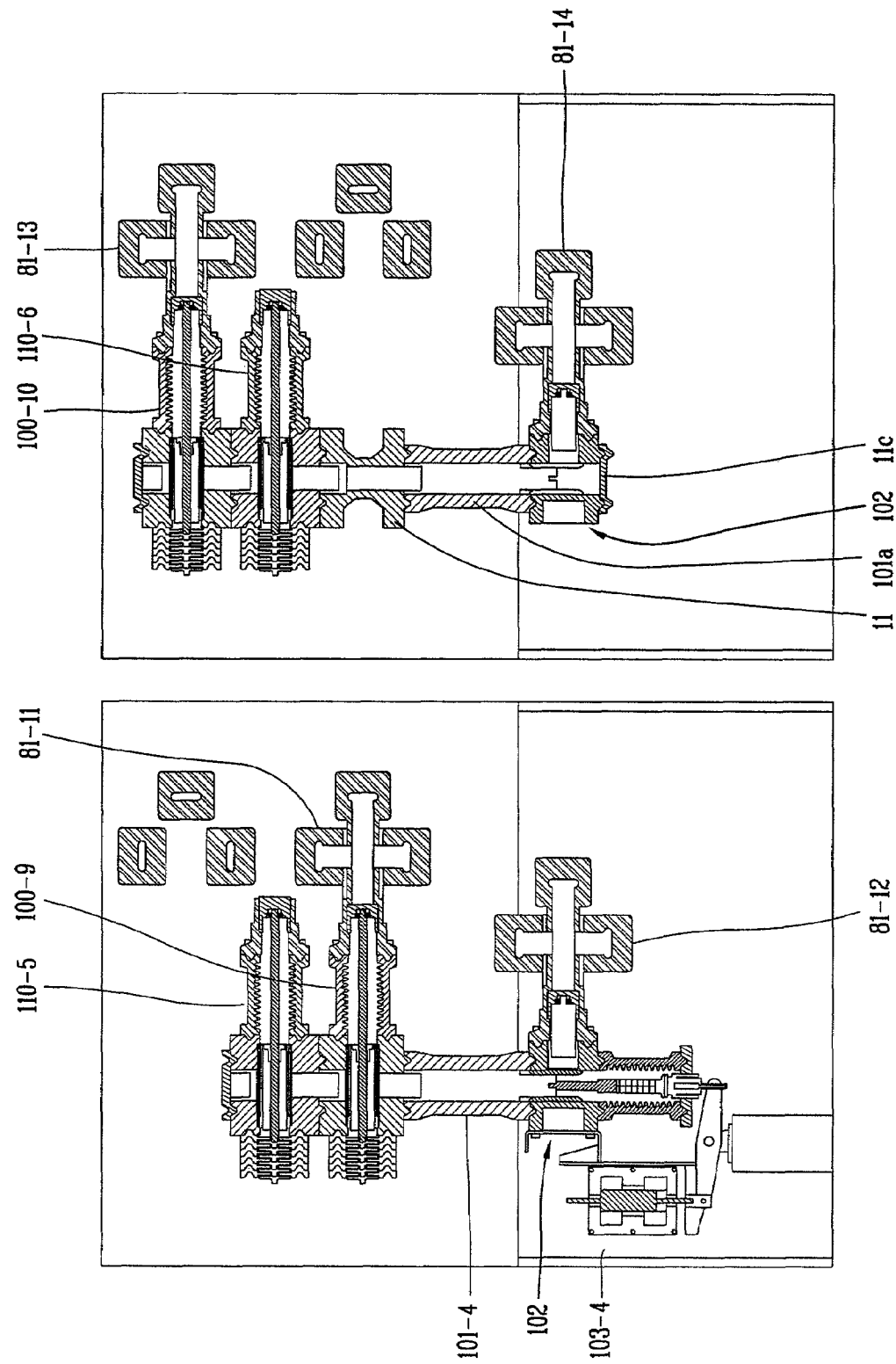

SOLID INSULATED DISCONNECTION SWITCH AND SOLID INSULATED SWITCHGEAR USING THE SAME

RELATED APPLICATION

The present disclosure relates to subject matter contained in priority Korean Application 2006-0042659, filed on May 11, 2006, which is herein expressly incorporated by reference in its entirety.

BACKGROUND OF THE INVENTION

1. Field of the Invention

The present invention relates to a disconnection switch which constitutes a main apparatus of a switchgear for receiving/distributing electric power, and more particularly, to a solid insulated disconnection switch unit and solid insulated disconnection switch including the unit capable of enhancing stability by applying a solid insulating construction on all over the disconnection switch for reducing an entire size thereby enhancing a spatial efficiency.

The present invention also relates to a solid insulated switchgear capable of having a smaller size than the conventional gas-insulated switchgear, capable of simplifying manufacturing, maintaining, and repairing processes, and capable of implementing various configurations by combining a plurality of units each formed of standardized components or parts to one another.

2. Description of the Background Art

A disconnection switch serves to isolate an electric circuit after removing an electric load current, and is different from a load break switch in that the disconnection switch does not switch the circuit of load current. The disconnection switch is a switch which is installed in a power-transmission site or a substation to switch the circuit when a connection to a main circuit need to be changed under the state without load with the circuit breaker opened.

The disconnection switch is housed in an airtight metal container whose inside is filled with an insulating material such as air, or an SF6 (6 sulfur fluoride) gas having more insulating effect than air, in order to keep the main circuits insulated from each other or the earth.

The disconnection switch comes in many switching structures, which switches the main circuit, with no electric load. The disconnection switch within the gas insulated switchgear using the SF6 gas, as shown in FIG. 1A-1B and 2, is now described.

FIG. 1A is a front view illustrating that the disconnection switch according to the related art is in an opened state, FIG. 1B is a front view illustrating that the disconnection switch according to the related art is in a closed state, and FIG. 2 is a plan view of the disconnection switch as shown in FIG. 1A.

The disconnection switch includes main buses 201 provided in parallel inside a container 210 so as to perform a gas insulation, a main circuit fixed contactor 230 fixed to the main bus 201, a main circuit movable contactor 220 which rotates to be connected to or be separated from the fixed contactor 230 and is coupled to a bushing 202, a driving mechanism 260 which drives the movable contactor 220, a power transferring shaft 240 which transfers power generated from the driving mechanism 260, and an insulating linker 250 which transfers the power to and maintains an insulation from the main circuit.

Operation of the disconnection switch will be explained.

FIG. 1A is a front view illustrating that the disconnection switch according to the related art is in a disconnected state (an opened state). The disconnected state means that the disconnection switch is disconnected from the main circuit, more specifically that the movable contactor 220 is disconnected from the fixed contactor 230.

The driving mechanism 260 driven by a motor, when receiving an electric signal for closing operation in the disconnected state, rotates the power transferring shaft 240, for example, by 50 degrees counterclockwise. As a result, the insulating linker 250, which is connected to the power transferring shaft 240 using a pin, moves downwards and rotates by 50 degrees counterclockwise to a position where the insulating linker 250 is positioned as shown in FIG. 1B. Accordingly, the movable contactor 220 is coupled to the fixed contactor 230, so that the main bus 201, the fixed contactor 230, the movable contactor 220, and the bushing 202 are electrically connected to each other, making it possible to normally operate the switchgear. This is hereinafter referred to as "the closed state"

Conversely, in order to disconnect the main circuit from the closed state, the power transferring shaft 240 rotates in opposite direction as above mentioned direction. As a result, the insulating linker 250 and the movable contactor 220 connected to the power transferring shaft 240 rotate to create the disconnected state that the fixed contactor 230 and the movable contactor 220 are separated from each other.

In the switchgear for receiving/distributing electric power having double main buses, the disconnection switch is provided for each of the main buses. So, when one main bus is in trouble, it is possible to provide electric power using the other main bus. The arrangement of the double main buses in the switchgear depends on the positional relationship between the main bus and the container 210. The main buses are usually provided in parallel to each other.

The recent trend towards automation, miniaturization, high reliability, and low cost requires the switchgear including the above disconnection switch to be developed in such a way as to follow the recent trend.

To that end, in addition to performing a basic function of changing the connection to the main circuit with no electric load, the disconnection switch has to minimize an insulation space required between the main circuits (corresponding to phases) and between the main circuit and the earth to reduce the size of the switchgear.

However, the use of the gas places as the insulating material imposes a limitation on reducing the size of the switchgear including the disconnection switch.

The reduction of the size of the disconnection switch has been achieved by providing insulating solid material barriers between some components of the disconnection switch instead of using the insulating gas, or increasing the gas pressure to maintain the insulation between the components of the disconnection switch. This makes it possible to largely reduce the size of the disconnection switch and requires everyday maintenance operations such as the cleaning of main buses, the checking of the gas pressure, or the like. The use of SF6 gas as the insulating gas in the disconnection switch is prohibited worldwide, because SF6 gas is the main factor increasing the atmosphere temperature.

The solid insulated switchgear according to the related art will be explained with reference to FIGS. 3 and 4

FIG. 3 is a circuit view showing a configuration of a switchgear system in accordance with the related art, and FIG. 4 is a sectional view showing a switchgear having a main unit according to a first embodiment of the related art. Referring to FIG. 3, the switchgear system in accordance with the related art includes a main unit for receiving electric power which is designated "MAIN" for a divided circuit portion, a feeder unit for supplying a current to a load which is designated "FEEDER" for a divided circuit portion, a measuring unit for measuring a voltage of a main bus which is designated "MEASURING" for a divided circuit portion, a section unit for separating the main bus from a circuit which is designated "SECTION" for a divided circuit portion, and a tie unit for connecting the two main buses to each other which is designated "TIE" for a divided circuit portion. Differently from FIG.3, if a single main bus is implemented, the tie unit is not required.

Referring to FIG. 3, the two upper lines represent two main buses on the power source side. The main unit includes a first disconnection switch (left side) and a second disconnection switch (right side) respectively connected to the two main buses that connect or disconnect a circuit, an earth switch (ES) connected to the first disconnection switch that grounds or disconnects a circuit, a circuit breaker (Vacuum Circuit Breaker, abbreviated as VCB hereinafter) commonly connected to the first and second disconnection switches that switches a circuit, a lightning arrestor (abbreviated as LA) to which the VCB is commonly connected for grounding lightning to the earth, a current transformer (CT) that measures a current of a circuit, and a potential transformer (abbreviated as PT hereinafter) that measures a potential (voltage) of a circuit.

Referring to FIG.3, the feeder unit has the same configuration as the main unit except that the PT is not provided.

Referring to FIG.3, the measuring unit includes a first disconnection switch (left side) and a second disconnection switch (right side) respectively connected to the two main buses that connect or disconnect a circuit, and a potential transformer respectively connected to the first and second disconnection switches, which measures each potential (voltage) of the two main buses.

Referring to FIG. 3, the section unit includes a third disconnection switch (the most left side DS connected to the upper main bus) connected to one of the two main buses that connect or disconnect a circuit; an earth switch (the most left side ES) connected to the third disconnection switch that grounds or disconnects a circuit; a fourth disconnection switch (a middle DS connected to the upper main bus) to which the third disconnection switch is connected, and which connects or disconnects the circuit; an earth switch (a middle ES) connected to the fourth disconnection switch, and which grounds or disconnects the circuit; a circuit breaker (the most left side VCB) connected between the third disconnection switch and the fourth disconnection switch, and which connects or disconnects the circuit; a current transformer (CT) (the right CT) connected between the circuit breaker and the fourth disconnection switch, and which measures an amount of a current flowing on the circuit; a fifth disconnection switch (left DS connected to the lower main bus) connected to the other main bus of the two main buses, and which connects or disconnects the circuit; an earth switch (the second ES from the left side) connected to the fifth disconnection switch, and which grounds or disconnects the circuit; a sixth disconnection switch (the most right side DS connected to the lower main bus) connected to the main bus to which the fifth disconnection switch is connected, and which connects or disconnects the circuit; an earth switch (the most right side ES) connected to the sixth disconnection switch, and which grounds or disconnects the circuit; a circuit breaker (the most right side VCB) connected between the fifth disconnection switch and the sixth disconnection switch, and which connects or disconnects the circuit; and a current transformer (the left CT) connected between the circuit breaker (the most right side VCB) and the fifth disconnection switch, and which measures an amount of a current flowing on the circuit.

Referring to FIG. 3, the tie unit includes a seventh disconnection switch (the left DS connected to the upper main bus) connected to one main bus of the two main buses, and which connects or disconnects the circuit; an earth switch (the left ES) connected to the seventh disconnection switch, and which grounds or disconnects the circuit; an eighth disconnection switch (the right DS connected to the lower main bus) connected to the other main bus of the two main buses, and which connects or disconnects the circuit; an earth switch (the right ES) connected to the eighth disconnection switch, and which grounds or disconnects the circuit; a circuit breaker (VCB) connected between the seventh disconnection switch and the eighth disconnection switch, and which connects or disconnects the circuit; and a current transformer connected between the circuit breaker (the VCB) and the eighth disconnection switch, and which measures an amount of a current flowing on the circuit.

The switchgear according to the related art does not always require all of the five units, but selectively requires the five units according to a user's demand. Generally, the switchgear basically includes the main unit for receiving electric power, the feeder unit for feeding electric power to a load, and the measuring unit for measuring electrical potential. The switchgear may selectively include the section unit and the tie unit. All of the five units need to be individually manufactured by a manufacturer so as to meet a customer's various demand.

FIG. 4 is a section view showing a switchgear having a main unit according to one embodiment of the related art.

Referring to FIG. 4, two upper and lower main buses 83 are respectively connected to a circuit breaker 101 via 3-way switches 100a and 100b implemented by combining an earth switch and a disconnection switch to each other. Another side of the circuit breaker is connected to a cable 105, thereby receiving electric power or feeding electric power to a load. An insulating spacer 51 for preventing an abnormal current from being transmitted and for dividing a sealing chamber of SF6 gas is disposed between the 3-way switches 100a and 100b and the circuit breaker 101. A driving source assembly 61 for driving the 3-way switches 100a and 100b, and a driving mechanism 103 for driving the circuit breaker 101 are provided.

A current transformer (CT) is disposed to surround the cable 105 so as to measure a current applied to the cable 105.

Operation of the conventional switchgear having a main unit will be explained.

Referring to FIG. 4, when a middle movable contact of the 3-way switches 100a and 100b moves to be connected to the lower main bus (power source side terminal), the circuit from the main bus 83 to the cable 105 is closed under a state that a contactor of the circuit breaker 101 is connected to the middle movable contactor. If the middle movable contactor of the 3-way switches 100a and 100b is connected to a ground terminal 33a, the circuit is grounded.

Under a state that the middle movable contact (not shown) of the 3-way switches 100a and 100b moves to be connected to the lower main bus (power source side terminal) (closed circuit state), when an abnormal current (a large current) flows onto the circuit and a signal due to the abnormal current is transmitted to a controller (not shown) from the CT, the controller drives the driving mechanism. Accordingly, the circuit breaker 101 is operated at a position to break the circuit, and the circuit from the main bus to the cable (load side) is opened.

In case of switching a main bus when the circuit is maintained or repaired or in no-load state, the circuit breaker 101 is operated to a position for breaking the circuit. Then, the middle movable contactor (not shown) of the 3-way switches 100a and 100b moves to be connected to the ground terminal 33a, thereby flowing remaining current to the earth. Then, the driving source assembly 61 is operated thus to move the middle movable contactor of the 3-way switches 100a and 100b to a closed state that the circuit is connected to no terminal or no main bus as shown in FIG. 4. Then, an operator can repair and replace the circuit, and cuts the main bus.

However, the gas-insulated switchgear according to the related art has the following problems.

First, since SF6 gas for performing an insulation is harmful gas influencing on global warming, usage of the SF6 gas has been limited worldwide.

Second, the gas-insulated switchgear according to the related art is not size reduced, the components are not standardized, and each unit such as the disconnection switch, the earth switch, and the circuit breaker is not modularized. Accordingly, it takes a lot of time to manufacture and repair the switchgear, and the components do not have extensibility for the future additional installation according to various conditions.

SUMMARY OF THE INVENTION

Therefore, an object of the present invention is to provide a disconnection switch capable of implementing a simple and size-reduced configuration by applying a solid insulating method, and capable of having high compatibility and reliability and an eco-friendly characteristic.

Another object of the present invention is to provide a solid insulated switchgear capable of minimizing the number of parts and using no gas harmful to the environment by applying a solid insulation method.

Still another object of the present invention is to provide a solid insulated switchgear capable of simplifying manufacture, maintenance and repair processes by standardizing components, modularizing each unit, and by integrating each function, and capable of being easily installed according to various installation environments.

To achieve these and other advantages and in accordance with the purpose of the present invention, as embodied and broadly described herein, there is provided a solid insulated disconnection switch, comprising: a base frame tunneled in one direction, having a load connection portion for electrically connecting to a load, and formed of an insulating solid material to surround the load connection portion; a driving source assembly which generates rotating power; an insulating shaft formed of an insulating material, rotated by the rotating power generated from the driving source assembly, and having a thread portion on an outer circumferential surface thereof; a stationary contactor electrically connected to a power source side, and having a fixed contact surrounded by an insulating solid material; a movable contactor engaged with the insulating shaft in mesh, electrically connected to the load connection portion of the base frame, and linearly movable to a position contacting to a fixed contact of the stationary contactor or a position separated from the fixed contact of the stationary contactor in accordance with the rotation of the insulating shaft; an insulating spacer disposed between the base frame and the stationary contactor to secure an electric insulation, and formed of an insulating solid material having an cavity therein to allow the movable contactor to move through; and a power transferring assembly disposed between the driving source assembly and the insulating shaft, for transferring the rotating power generated from the driving source assembly to the insulating shaft, and electrically insulating the driving source assembly and the base frame from each other.

To achieve these and other advantages and in accordance with the purpose of the present invention, as embodied and broadly described herein, there is also provided a solid insulated switchgear comprising a main unit for receiving electric power, the main unit comprises: a first main bus connection portion to which a first main bus of one power source side is connected; a second main bus connection portion to which a second main bus of another power source side is connected; a first disconnection switch electrically connected to or separated from the first main bus connection portion; a second disconnection switch having parts interchangeable with the parts of the first disconnection switch, and electrically connected to or separated from the second main bus connection portion, an earth switch having parts interchangeable with the parts of the first disconnection switch, and switchable to a position grounded and a position separated from the earth, for electrically connecting the first disconnection switch and the second disconnection switch to each other; a circuit breaker electrically connected to the second disconnection switch, for connecting part corresponding to the fixed contactor to the earth, and conducting or breaking a circuit from the second disconnection switch; a driving mechanism for driving the circuit breaker to a connecting position or a breaking position; and a cable socket electrically connected to the circuit breaker, and having a socket portion electrically connected to a load side cable, wherein the first disconnection switch comprises a base frame tunneled in one direction, having a load connection portion for electrically connecting to a load, and formed of an insulating solid material to surround the load connection portion; a driving source assembly which generates rotating power; an insulating shaft formed of an insulating material, rotated by the rotating power generated from the driving source assembly, and having a thread portion on an outer circumferential surface thereof; a stationary contactor electrically connected to the first main bus connection portion, and having a fixed contact surrounded by an insulating solid material; a movable contactor engaged with the insulating shaft in mesh, electrically connected to the load connection portion of the base frame, and linearly movable to a position contacting to a fixed contact of the stationary contactor and a position separated from the fixed contact of the stationary contactor in accordance with the rotation of the insulating shaft; an insulating spacer disposed between the base frame and the stationary contactor to secure an electric insulation, and formed of an insulating solid material having a cavity therein to allow the movable contactor to move through; and a power transferring assembly disposed between the driving source assembly and the insulating shaft, for transferring the rotating power generated from the driving source assembly to the insulating shaft, and electrically insulating the driving source assembly and the base frame from each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 11B is a perspective view showing a coupling method for the power transferring assembly of FIG. 11A;

FIG. 16A is a sectional view showing a section unit according the present invention;

DETAILED DESCRIPTION OF THE INVENTION

Reference will now be made in detail to the preferred embodiments of the present invention, examples of which are illustrated in the accompanying drawings.

Hereinafter, a solid insulated disconnection switch and a solid insulated switchgear using the same will be explained in more detail.

Figure 5:
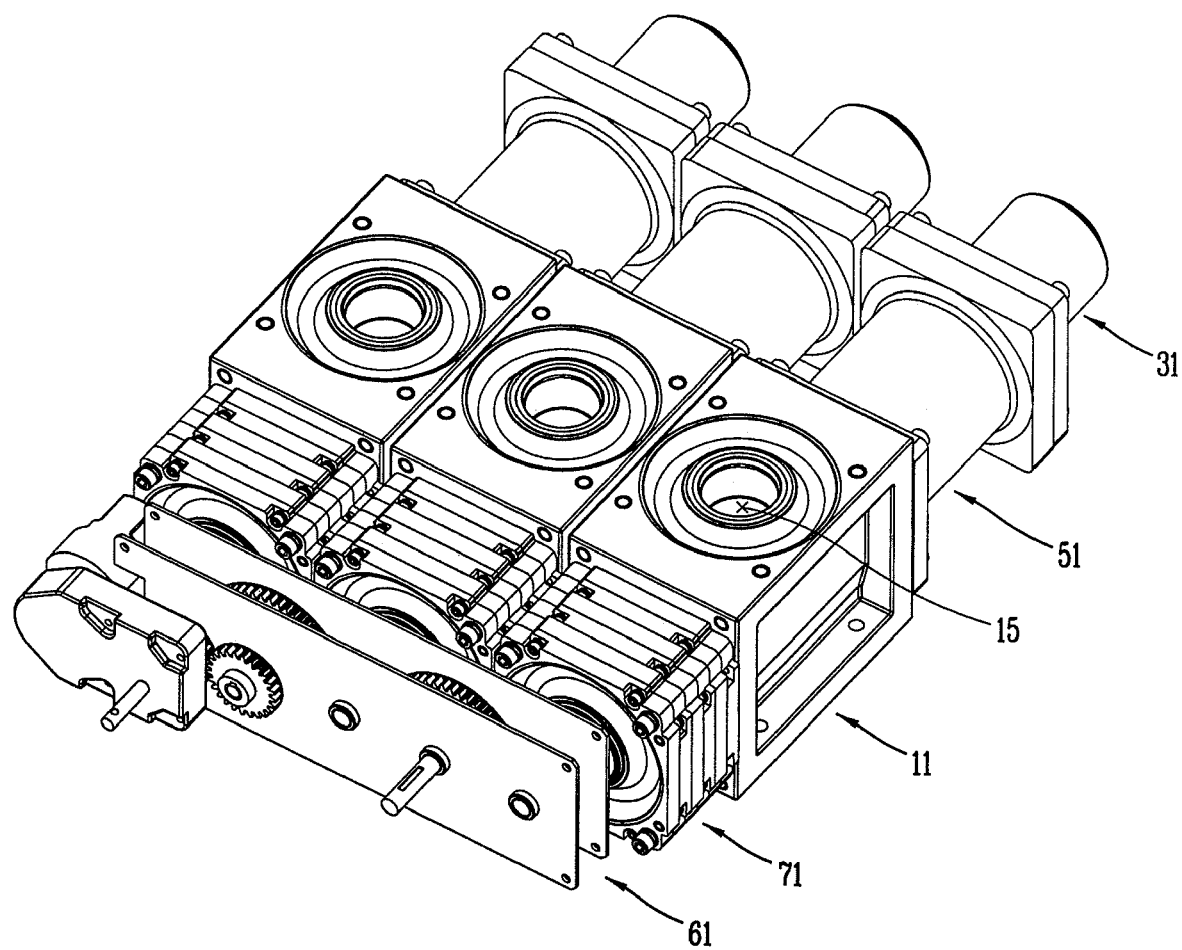
FIG. 5 is a perspective view showing an assembled state of a disconnection switch according to a first embodiment of the present invention.
Figure 6A:
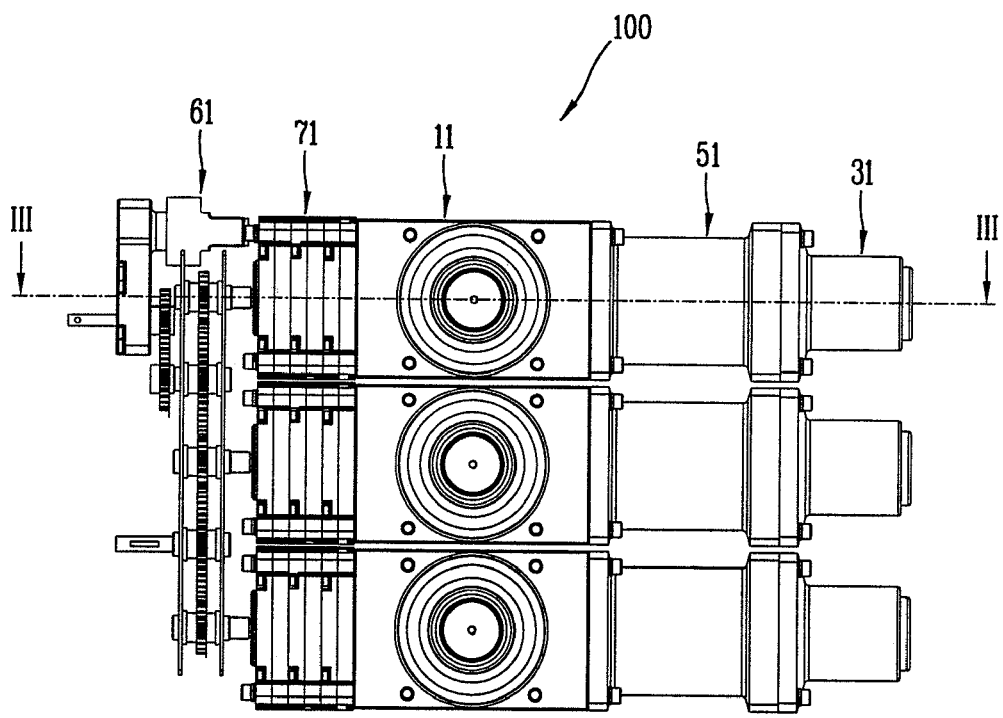
FIG. 6A is a plan view showing the disconnection switch of FIG. 5.
Figure 6B:
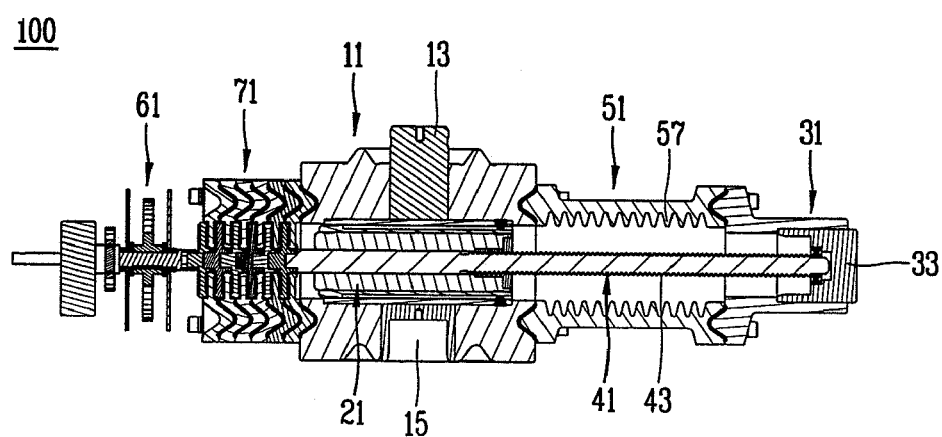
FIG. 6B is a section view showing an opened state of the disconnection switch of FIG. 6A taken along line 'III-III' of FIG. 6A.
Figure 7:
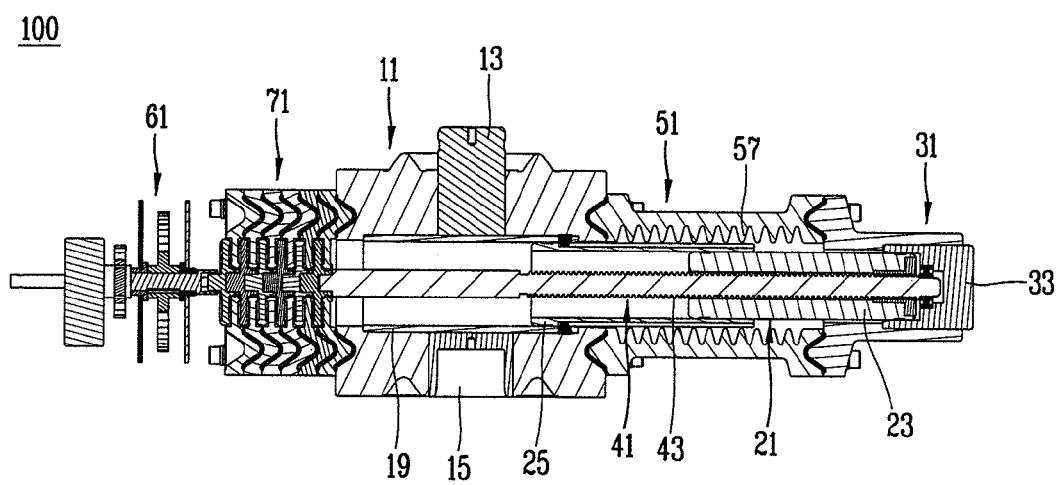
FIG. 7 is a section view showing a closed state of the disconnection switch of FIG. 6B.

FIG. 5 is a perspective view showing an assembled state of a disconnection switch according to a first embodiment of the present invention, FIG. 6A is a plan view showing the disconnection switch of FIG. 5, FIG. 6B is a section view showing an opened state of the disconnection switch of FIG. 6A taken along line 'II-II' of FIG. 6A, and FIG. 7 is a section view showing a closed state of the disconnection switch of FIG. 6B.

As shown in FIGS. 5 to 7, the switchgear for receiving/distributing electric power includes three disconnection switches 100 disposed in parallel with each other in correspondence with a three-phase AC(Alternating Current) circuit.

The disconnection switch 100 includes a base frame 11 having a body portion for division-connecting an electric load, a stationary contactor 31 connected to a electric power source(not shown), a movable contactor 21 linearly movable to a position contacting to the stationary contactor 31 or a position separated from the stationary contactor 31, an insulating shaft 41 which transmits a driving force to the movable contactor 21, an insulating spacer 51 which provides an insulating distance between the movable contactor 21 and the stationary contactor 31 in an opened state, a driving source assembly which provides a rotating power source, and a power transferring assembly 71 which transmits the rotating power from the driving source assembly 61 to the insulating shaft 41.

As shown in FIG. 7, the base frame 11 includes a load connection portion having a load connection conductor for transmitting a current supplied form the stationary contactor 31 to a electric load(not shown) in a closed state. The load connection portion has a protruding connection portion 13 having a convex shape and inserted into one load side conductor thus to be electrically connected thereto, and a concave connection portion 15 having a concave shape and inserted into another load side conductor thus to be electrically connected thereto. The load connection portion is implemented as a frame having a cavity tunneled in one direction, and is formed of an insulating solid material.

The movable contactor 21 separated from the stationary contactor 31 is disposed in the cavity of the base frame 11. More concretely, a base frame conductor 19 having the cavity is fixed to an inner circumferential surface of the base frame 11 so as to be electrically connected to the load connection portion composed of the protruding connection portion 13 and the concave connection portion 15. A load side movable conductor 25 of the movable contactor 21 is slidably disposed in the cavity of the base frame conductor 19 in a longitudinal direction (horizontally) in a state of being electrically connected to the base frame conductor 19. The load side movable conductor 25 performs a slidable motion in the cavity of the base frame conductor 19. However, the base frame conductor 19 and the load side movable conductor 25 are electrically connected to each other by a sliding contact between an inner circumferential surface of the base frame conductor 19 and a load side band contact 28 (refer to FIG. 9) installed to surround an outer circumference of one end of the load side movable conductor 25. The band contact 28 is a commercial product available as a trademark "Multi Band" on the market.

The term "band contact" is abbreviation for LA-CU Multilam Contact Band manufactured by Multi-Contact AG in Germany. The band contact is implemented by connecting a plurality of thin copper contact plates between two long-extended stainless strips. The band contact, which has high electric conductivity, high abrasion resistance, and high heat resistance, recently has been started to use as industrial electrical contact material for electrical connection or breaking operation.

As shown in FIG. 6B, the movable contactor 21 is disposed in the base frame 11 in an opened state that the movable contactor 21 is separated from the stationary contactor 31. However, in a closed state, the movable contactor 21 moves towards the stationary contactor 31 to come in contact with a fixed contact 33, thereby forming a circuit which supplies a current to an external load. Over the circuit, the current flows from a power supply to the external load, through the main bus, a main bus connection portion 81 (refer to FIG. 8), the fixed contact 33, the movable contactor 21, and the base frame conductor 19 of the base frame 11. The movable contactor 21 will be explained with reference to FIG. 9.

In FIG. 7, the stationary contactor 31 is disposed at one end of the disconnection switch 11 in a longitudinal direction, and is connected to the main bus connection portion 81. The stationary contactor 31 is electrically connected to the movable contactor 21 by contacting thereto in a closed state, and has a 'U'-shaped section. The movable contactor 21 is inserted into the 'U'-shaped portion thus to slidably contact and to be conducted. One end of the insulating shaft 41 is rotatably supported at the 'U'-shaped portion of the stationary contactor 31 by is rotation supporting means such as a bearing.

The insulating shaft 41 is formed of a reinforced plastic having desirable insulation and abrasion resistance. The insulating shaft 41 serves as a dynamic power transferring unit for moving the movable contactor 21 to a position to contact the stationary contactor 31 or a position to be separated from the stationary contactor 31. As one method for moving the movable contactor 21 to a position to contact the stationary contactor 31 or a position to be separated from the stationary contactor 31, the insulating shaft 41 having a thread portion 43 to enable a dynamic power transmission, having a long surface insulating distance, and having a short actual straight length was adopted in the present invention. A thread portion 43 is formed at the insulating shaft 41, and a corresponding thread portion is also formed at an inner circumferential surface of the movable contactor 21. Accordingly, the insulating shaft 41 is rotated by receiving power from the driving source assembly 61, and thus the movable contactor 21 is linearly movable along the thread portion 43 of the insulating shaft 41 (refer to FIG. 9). To this end, the insulating shaft 41 is disposed in passing through the movable contactor 21 and the base frame 11. One end of the insulating shaft 41 is rotatably supported by the stationary contactor 31, and another end of the insulating shaft 41 is connected to the power transferring assembly 71.

The insulating spacer 51 is disposed between the base frame 11 and the stationary contactor 31 so that the movable contactor 21 and the stationary contactor 31 can obtain a sufficient space and a sufficient surface insulating distance in an opened state.

The insulating spacer 51 is provided with a cavity therein to allow the movable contactor 21 to move through. A concave-protruding portion 57 having a 1S plurality of concave and protruding portions is disposed at an inner circumferential surface of the insulating spacer 51 that defines the cavity, thereby increasing a surface insulating distance. Owing to the concave-protruding portion 57, an insulating distance needed is obtained, and each length of the insulating spacer 51 and the disconnection switch 100 can be decreased.

The driving source assembly 61 is disposed at an opposite end to the end where the stationary contactor 31 is positioned, and provides driving power to rotate the insulating shaft 41. As the insulating shaft 41 is rotated, the movable contactor 21 linearly moves to a position to contact the stationary contactor 31 or to a position to be separated from the stationary contactor 31. The driving source assembly 61 will be explained in more detail with reference to FIG. 12A to 12B.

The power transferring assembly 71 is inserted between the driving source assembly 61 and the base frame 11, thereby transmitting power generated from the driving source assembly 61 to the insulating shaft 41. Also, the power transferring assembly 71 insulates an opposite opening to an opening of the base frame 11 that is disposed towards the stationary contactor 31. The power transferring assembly 71 will be explained in more detail with reference to FIGS. 10A-10C and 11A-11B.

A enclosure enclosing the base frame 11, the stationary contactor 31, the insulating shaft 41, the insulating spacer 51, and the power transferring assembly 71 are all made of an insulating solid material. The internal components requiring the electrical connection are made of a metallic conductor, such as the load connection portion inside the base frame 11, the load side band contact 28 on the movable contactor 21, a fixed contact side band contact 27, a load side movable conductor 25, a fixed contact side movable conductor 23, and the fixed contact 33. The disconnection switch of the present invention may be formed of an insulating solid material such as an engineering plastic, polymer, and epoxy. In the present invention, the disconnection switch is formed of epoxy having high insulation and mechanical strength, but not limited to the epoxy. Since the thread portion 43 has to be formed on the outer surface of the insulating shaft 41, the insulating shaft 41 is preferably formed of a reinforced plastic having better plasticity and insulation than the epoxy.

The driving source assembly 61, the power transferring assembly 71, the base frame 11, the insulating spacer 51, and-the stationary contactor 31 are linearly and sequentially disposed, which make it possible for the movable contactor 21 to be linearly movable to a position to contact the fixed contact or to a position to be separated from the stationary contactor.

Figure 1A:
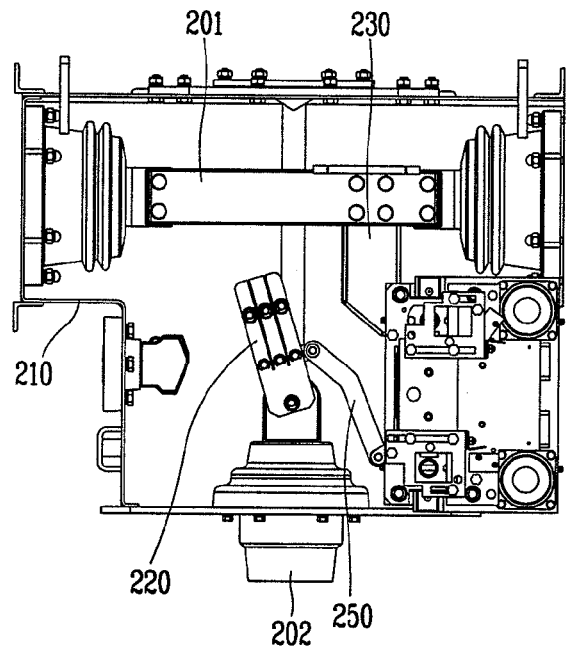
FIG. 1A is a front view showing an opened state of a disconnection switch in accordance with the related art.
Figure 1B:
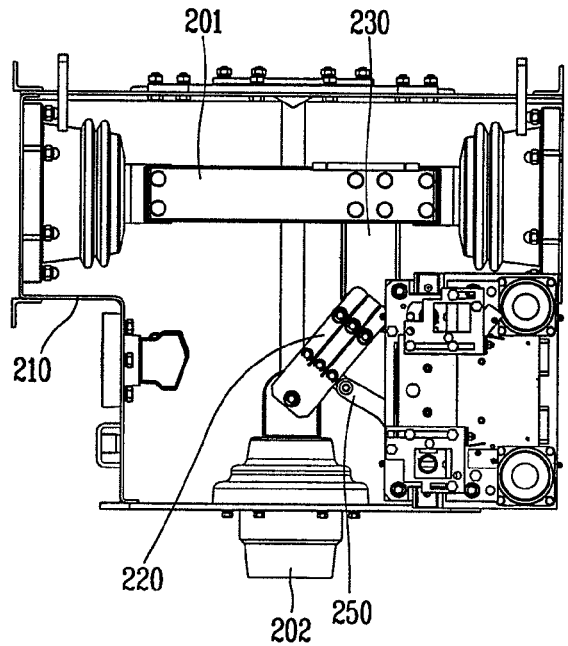
FIG. 1B is a front view showing a closed state of the disconnection switch of FIG. 1A.
Figure 2:
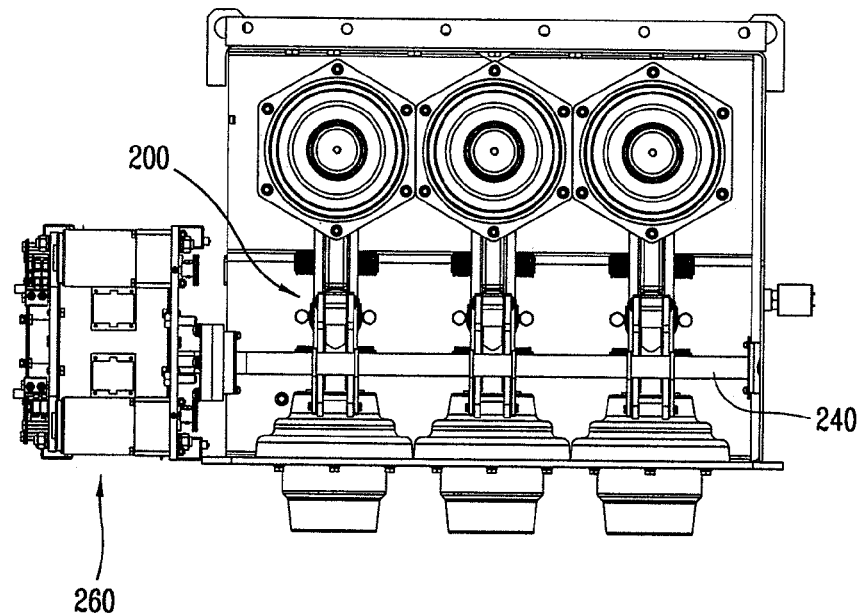
FIG. 2 is a plan view showing the disconnection switch of FIG. 1A.
Figure 3:
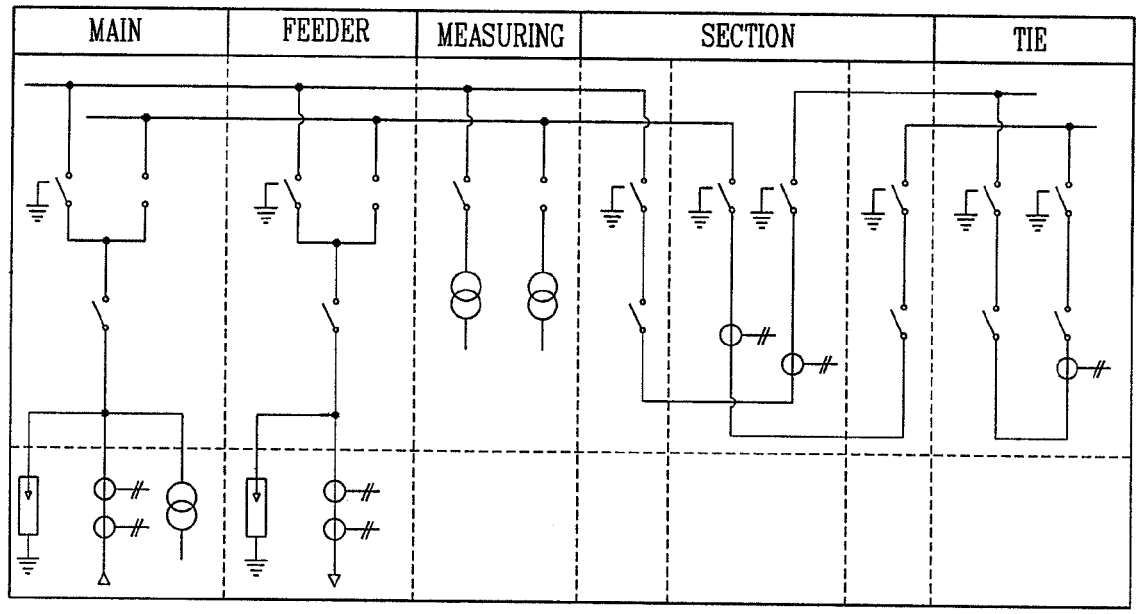
FIG. 3 is a circuit view showing a configuration of a switchgear in accordance with the related art.
Figure 4:
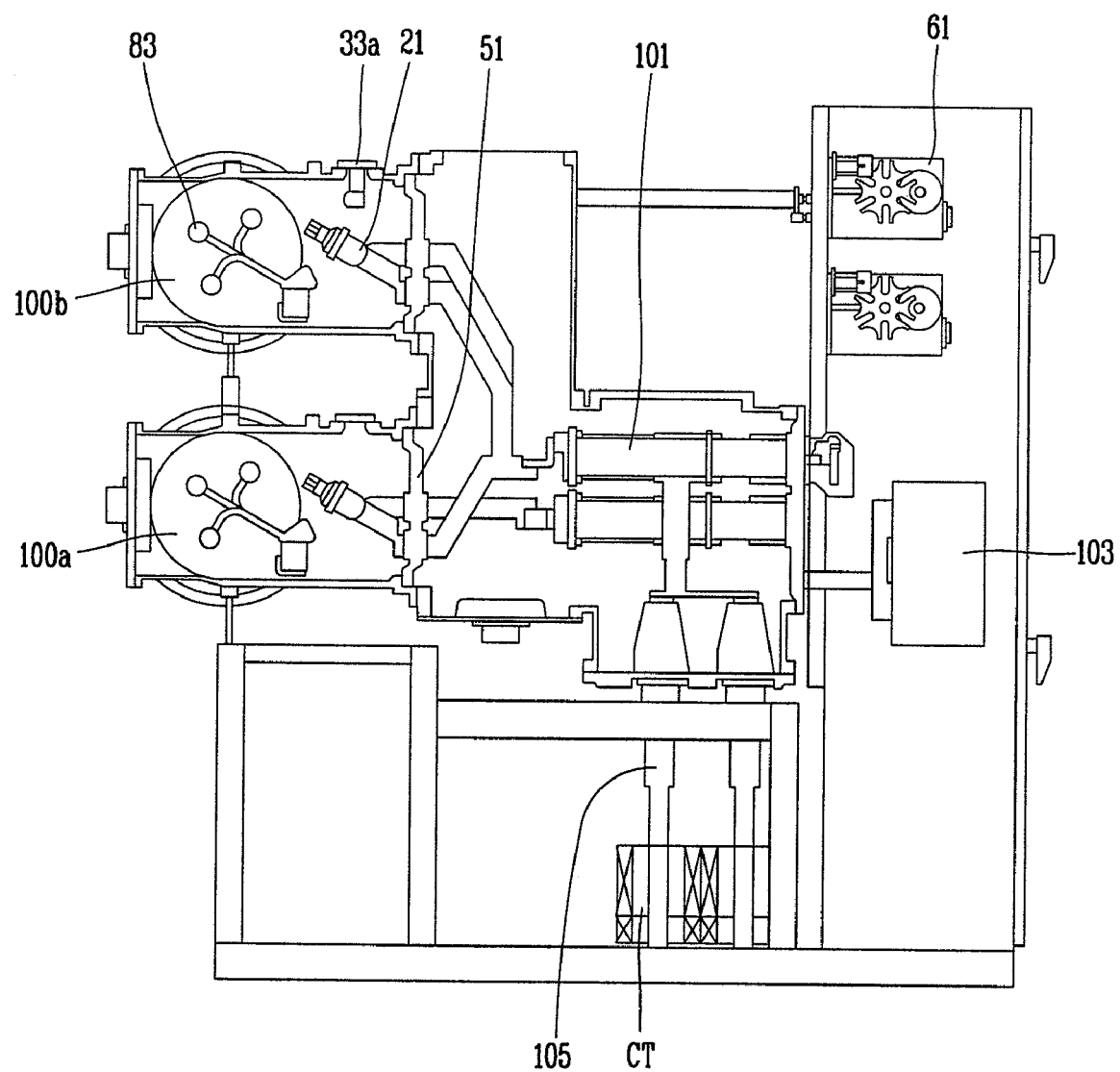
FIG. 4 is a section view showing a switchgear having a main unit according to one embodiment of the related art.

The above linear arrangement of the components may reduce the space occupied by the disconnection switch, compared to the arrangement of the parts of the disconnection switch according to the related art, as shown in FIG. 1A and 1B, where the main bus 201 and the contacts 220 and 230 are disposed in a crossing manner in upper and lower positions. The reduction in the size of the disconnection switch enables the reduction in the radius of a pipeline-structured container in which the disconnection switch is installed. Accordingly, an installation space and manufacturing cost for the switchgear are decreased.

Figure 8:
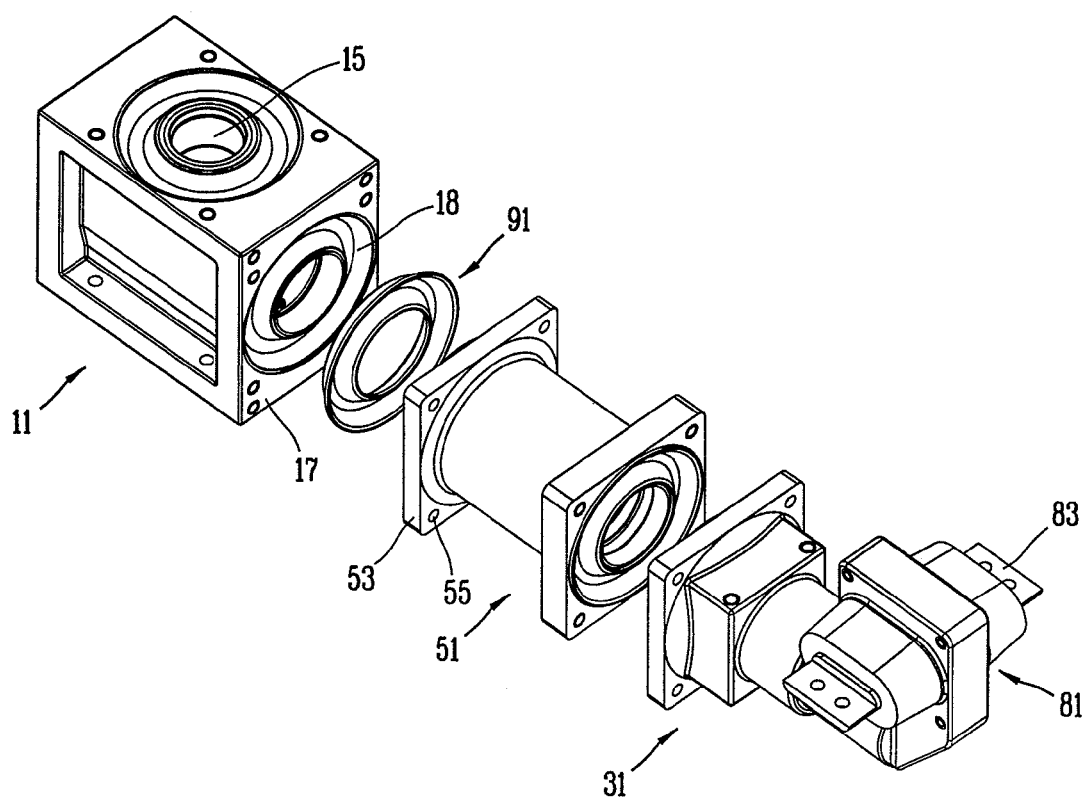
FIG. 8 is a exploded perspective view showing a base frame, an insulating spacer, and a fixed contactor of FIG. 6B.

FIG. 8 is a exploded perspective view showing a base frame, an insulating spacer, and a fixed contact of FIG. 6B.

Referring to FIG. 8, an insulating plate 91 for electrically insulating each component of the disconnection switch has an opened center thus not to serve as an obstacle when the movable contactor 21 moves. The insulating plate 91 is formed of an insulating solid material like other parts such as the base frame. The insulating plate 91 has to have higher flexibility and tightness than the other parts, though its mechanical strength is lower, thereby insulating each part from each other by preventing a current leakage to a gap therebetween. In the present invention, the insulating plate 91 is formed of a silicon resin. However, the material of the insulating plate 91 is not limited to the silicon resin.

When the power transferring assembly 71, the base frame 11, the insulating spacer 51, and the stationary contactor 31 are to be connected to each other, the insulating plate 91 is inserted therebetween. The insulating plate 91 has a curved shape so as to obtain a long surface insulating distance. Each contact surface of the power transferring assembly 71, the base frame 11, the insulating spacer 51, and the stationary contactor 31 to the insulating plate also is also formed to have a curved shape.

The insertion of the insulating plate 91 between the base frame 11 and the insulating spacer 51, for example, will be explained with reference to FIG. 8.

The insulating plate 91 has a 'V'-shaped protruding or curved portion (a 'V'-shaped concave portion when viewed in a rear direction) so as to increase a surface insulating distance. A 'V'-shaped connection groove 18 is disposed at a contact surface 17 of the base frame 11, and a ring-shaped protrusion adhered to the concave portion of the insulating plate 91 is disposed at a corresponding contact surface of the insulating spacer 51 (refer to FIG. 7).

Accordingly, the insulating plate 91 inserted between the base frame 11 and the insulating spacer 51 completely blocks a gap therebetween, thereby preventing a current leakage through the gap. The base frame 11 and the insulting spacer 51 may be coupled to each other by welding, or by combining a nut hole provided on the contact surface 17 to a bolt hole 55 provided on a connecting plate 53.

Each configuration and operation of the movable contactor and the insulating shaft will be explained in more detail with reference to FIG. 9.

Figure 9:
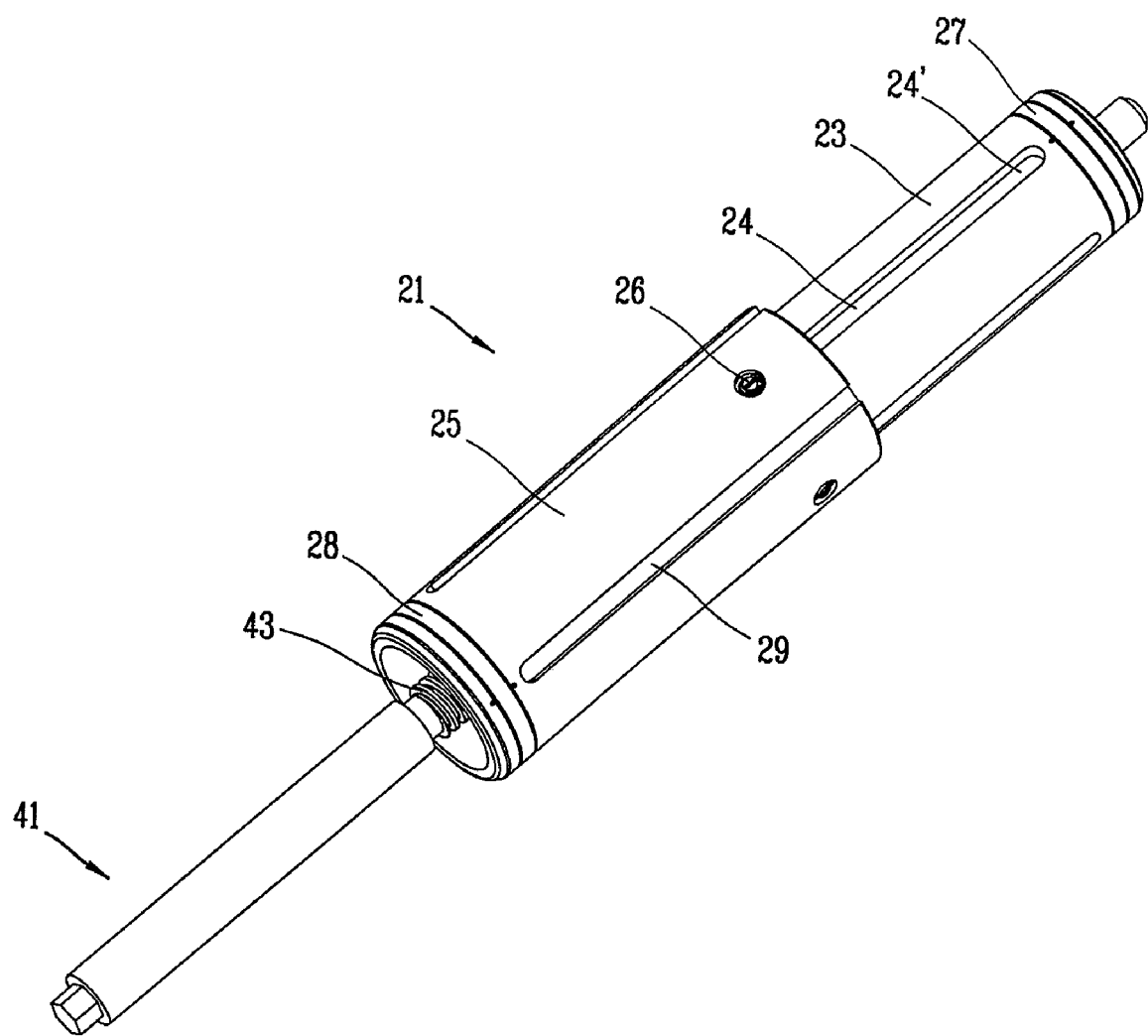
FIG. 9 is a perspective view showing a configuration and an operation of a movable contactor and an insulating shaft of FIG. 6B.

As shown in FIG. 9, the movable contactor 21 includes a fixed contact side movable conductor 23 and a load side movable conductor 25.

A thread portion is formed at an inner circumferential surface of the fixed contact side movable conductor 23, thereby being engaged with the thread portion 43 formed on the outer surface of the insulating shaft 41 inserted into the fixed contact side movable conductor 23. The fixed contact side band contact 27 is provided along an outer surface of one end of the fixed contact side movable conductor 23 which, when in the connected state, is connected to the fixed contact 33. A guide slot 24 is formed on an outer circumferential surface of the fixed contact side movable conductor 23 in a longitudinal direction.

The load side movable conductor 25 has an inner diameter larger than an outer diameter of the fixed contact side movable conductor 23, thereby allowing the fixed contact side movable conductor 23 to be inserted thereinto or drawn therefrom. The protruding connection portion 13 is electrically connected to the base frame conductor 19. The load side band contact 28 electrically connected to the base frame conductor 19 by contact is provided along an outer surface of one end of the load side movable conductor 25.

The load side band contact 28 is always electrically connected to the base frame conductor 19 irrespective of a position change of the movable contactor 21. That is, even if the load side movable conductor 25 is moved to a position for closing the circuit, the load side band contact 28 of the load side movable conductor 25 performs a sliding motion with a contact state to the base frame conductor 19.

A rotation preventing slot 29 is disposed on an outer circumferential surface of the load side movable conductor 25 in a longitudinal direction. A rotation preventing pin (not shown) protruding from an inner circumferential surface of the base frame conductor 19 (refer to FIG. 7) is inserted into the rotation preventing slot 29, thereby allowing the load side movable conductor 25 to be linearly-moved in a longitudinal direction with preventing a rotation. By the rotation preventing pin and the rotation preventing slot 29, the load side movable conductor 25 is allowed to be linearly-movable but is prevented from being rotated. Also, by the guide slot 24 formed at the fixed contact side movable conductor 23 and a guide pin 26 formed at the load side movable conductor 25, the fixed contact side movable conductor 23 is allowed to be linearly-movable, without being rotated.

As shown in FIG. 6B, in an opened state that the load side movable conductor 25 and the fixed contact side movable conductor 23 stay within the base frame 11, when the insulating shaft 41 is rotated in one direction, the fixed contact side movable conductor 23 is linearly-moved towards the fixed contact 33. When the guide pin 26 is engaged to an end wall (not shown) of the guide slot 24 adjacent to the load side movable conductor 25, the load side movable conductor 25 is pulled out by the fixed contact side movable conductor 23 with a maximum state (refer to FIG. 7). Then, as the insulating shaft 41 is rotated in one direction, the load side movable conductor 25 starts to linearly move towards the fixed contact 33 by the fixed contact side movable conductor 23. The load side movable conductor 25 continues to linearly move until the rotation preventing pin of the base frame conductor 19 meets an left end wall of the rotating preventing slot 29.

Herein, the fixed contact side band contact 27 fixed to the end of the fixed contact side movable conductor 23 comes in contact with the fixed contact 33, thereby forming a closed circuit (refer to FIG. 7).

In the connected state, when the insulating shaft 41 is rotated in another direction, the fixed contact side movable conductor 23 is linearly moved towards a direction apart from the fixed contact 33 thus to be inserted into the load side movable conductor 25. Then, if the guide pin 26 is stopped at the end 24' of the fixed contact side band contact 27 of the guide slot 24 as the insulating shaft 41 is continuously rotated, the load side movable conductor 25 moves towards the base frame 11 by the guide pin 26. Accordingly, as shown in FIG. 6B, the load side movable conductor 25 is positioned in the base frame 11. Herein, the fixed contact side band contact 27 is separated from the fixed contact 33 with a sufficient space and surface insulating distance, thereby forming an opened circuit.

Differently from the double-structured configuration that the fixed contact side movable conductor 23 and the load side movable conductor 25 are separately disposed from each other, the fixed contact side movable conductor 23 and the load side movable conductor 25 may be implemented as a single body. That is, the movable contactor 21 is implemented as a hollow cylindrical body, and a band contact is fixed to outer circumferential surfaces of both ends. A thread portion corresponding to the thread portion 43 of the insulating shaft 41 is formed at an inner circumferential surface of the movable contactor 21. Also, the rotation preventing slot 29 for inserting the rotation preventing pin protruding from the base frame conductor 19 is formed at an outer circumferential surface of the movable contactor 21. Irrespective of the rotation of the insulating shaft 41, the movable contactor 21 performs only a linear reciprocation thus to allow to open and close the circuit. The one-structured movable contactor 21 has more simplified structure than the double-structured movable contactor 21. However, the one-structured movable contactor 21 requires the insulating spacer 51 to have a long length so as to obtain a suitable insulating distance, and causes an entire length of the disconnection switch 100 to be increased.

Accordingly, it is preferable to implement the double-structured movable contactor 21 rather than the one-structured movable contactor 21 in order to minimize the disconnection switch. Even though the double-structured movable contactor 21 was explained in the present invention, a multi-structured type movable contactor 21 having three or more structures can be implemented in order to more decrease the length of the disconnection switch 100.

For instance, when the movable contactor 21 is implemented as a three-structured one, a medium conductor (not shown) inserted into the load side movable conductor 25 is available as a cavity for inserting the fixed contact side movable conductor 23. Herein, a slot such as the guide slot 24 for inserting the guide pin 26, and a pin such as the guide pin 26 have to be formed at the medium conductor. A multi-structured movable contactor 21 having four or more structures for inserting a necessary number of medium conductors can be implemented.

Figure 10A:
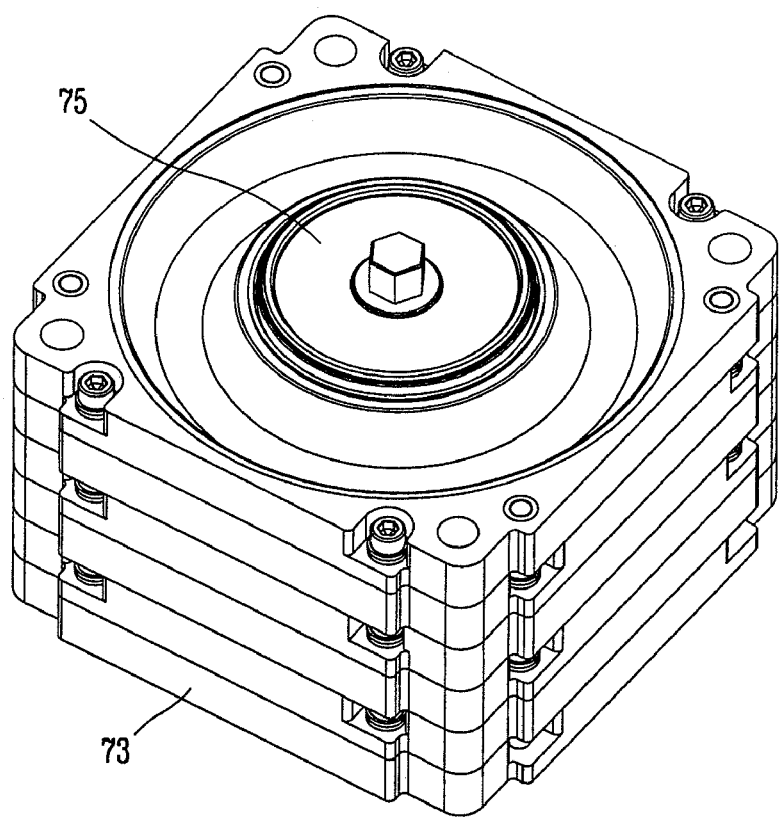
FIG. 10A is a perspective view showing a coupled state of a power transferring assembly of FIG. 6B.
Figure 10B:
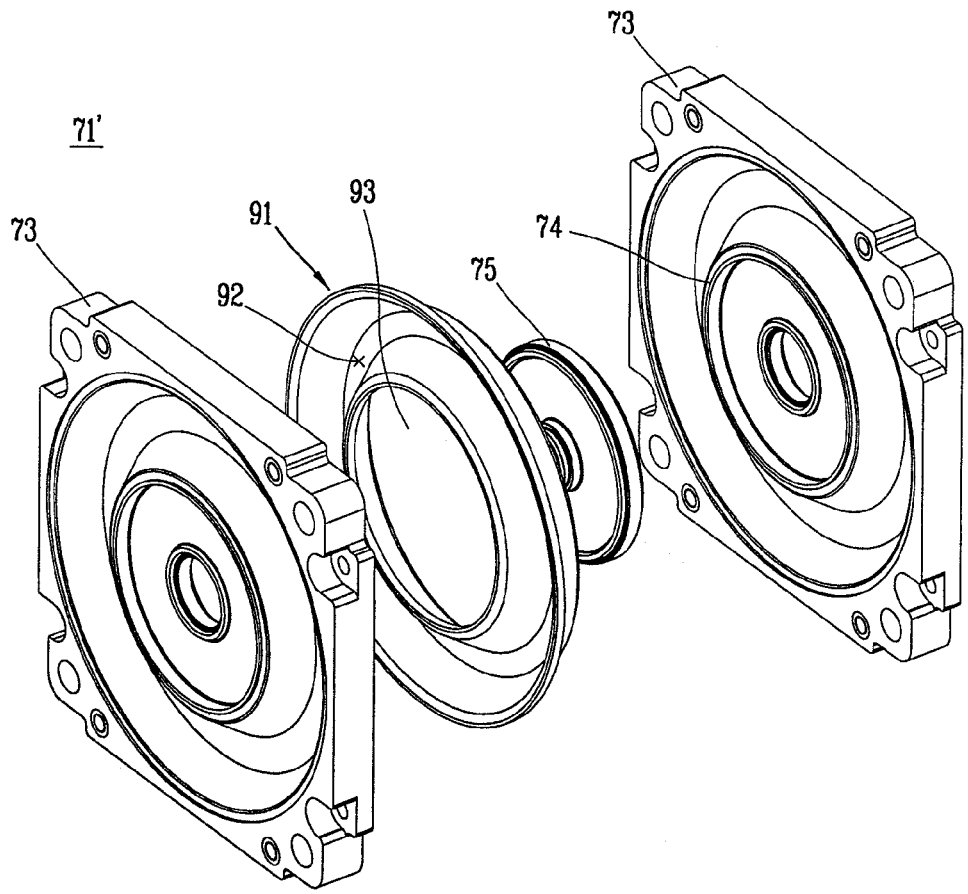
FIG. 10C is a section view of FIG. 10A.
Figure 10C:
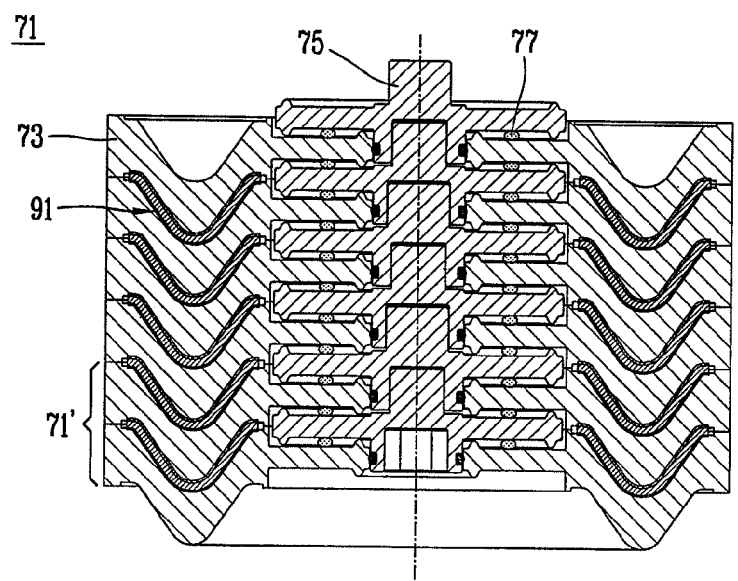

A configuration and operation of the insulated power transferring assembly 71 will be explained in more detail with reference to FIGS. 10A-10C and to 11A-11B.

As shown, the power transferring assembly 71 has a structure in which one or more power transferring units 71' are assembled to each other according to a rated voltage required of the switchgear within which the disconnection switch is installed.

The power transferring unit 71' includes one or more rotators 75 disposed between the driving source assembly and the insulating shaft and rotated by power generated from the driving source assembly, for rotating the insulating shaft, a pair of insulating housings 73 formed of an insulating solid material, for rotatably supporting the rotator 75, and an insulating plate 91 disposed between the one pair of insulating housings 73. The insulating plate 91 has an opening 93 at a center thereof, and has a concave portion 92 so as to increase a surface insulating distance.

As the rotator 75 passes through the opening 93 of the insulating plate 91, both surfaces of the rotator 75 face the insulating housings 73. As shown in FIG. 8C, the rotator 75 has a circle shape. A protruding axis region is formed on one central side of the rotator 75, and an axis-receiving region is formed on anther central side of the rotator 75. The protruding axis region and the axis-receiving region are fitted to each other to assemble the two rotators.

A clearance is generated between the rotator 75 and the insulating housing 73, thereby rotating the rotator 75. In the present invention, approximately 1 mm of clearance is implemented. An O-ring 77 is disposed between the rotator 75 and the insulating housing 73 thus to maintain the clearance. Accordingly, the rotator 75 can be easily rotated between the one pair of insulating housings 73 in a state that a frictional force is minimized.

Since the rotator 75 has the protruding axis region and the axis-receiving region on each center of both surfaces thereof, a surface insulating distance thereof is increased. If the two rotators 75 are assembled by coupling the protruding axis region and the axis-receiving region to each other, the surface insulating distance is increased two times. The rotator 75 serves to transfer the dynamic power generated from the driving source assembly 61 to the insulating shaft 41, and serves to provide a sufficient surface insulating distance to secure an electrical insulation between the driving source assembly 61 and the base frame 11. According to experiments of the present invention, the switchgear with the rated voltage of 24 kV or 25.8 kV needs five rotators 75 to guarantee the insulation. Herein, six insulating housings 73 and five insulating plates 91 are necessary as well. That is, three power transferring units 71' are assembled to one another (Refer to FIG. 10C). A protruding portion 74 and the concave portion 92 are disposed at both surfaces of the power transferring unit 71'. Accordingly, when the power transferring units 71' are coupled to each other, a coupled volume is minimized and a surface insulating distance is sufficiently obtained. The protruding portion 74 and the concave portion 92 may be applied by having various protruding or concave degrees (the number of protruding and concave portions).

Accordingly, the present invention is not limited to the drawing.

The size of the power transferring assembly 71 can be reduced by the configuration of the power transferring unit 71', thereby reducing the entire size of the disconnection switch.

A connection method may be variously implemented between the rotators 75, between the rotator 75 and a main rotation axis 63 of the driving source assembly 61, and between the rotator 75 and the insulating shaft 71. As one method, a protruding portion is formed at one side of the power transferring assembly 71, and a concave portion for inserting the protruding portion is formed at another side of the, power transferring assembly 71.

Figure 11A:
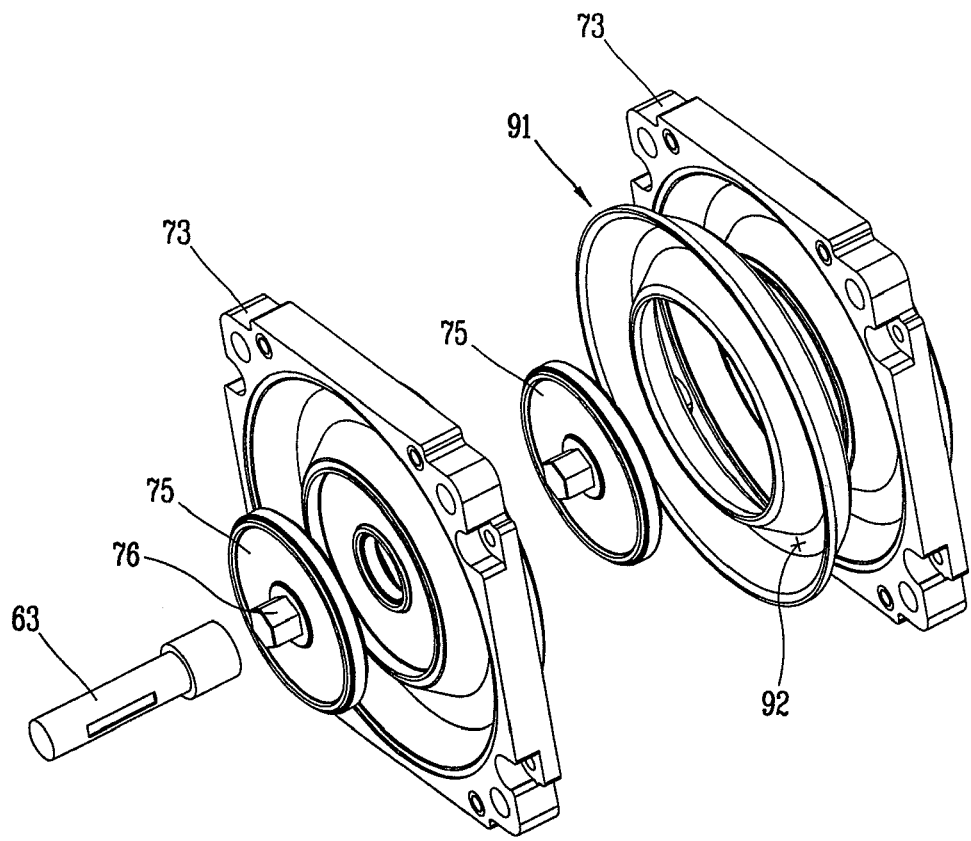
FIG. 11A is a exploded perspective view showing a coupled state of the power transferring assembly of FIG. 10A.
Figure 11B:
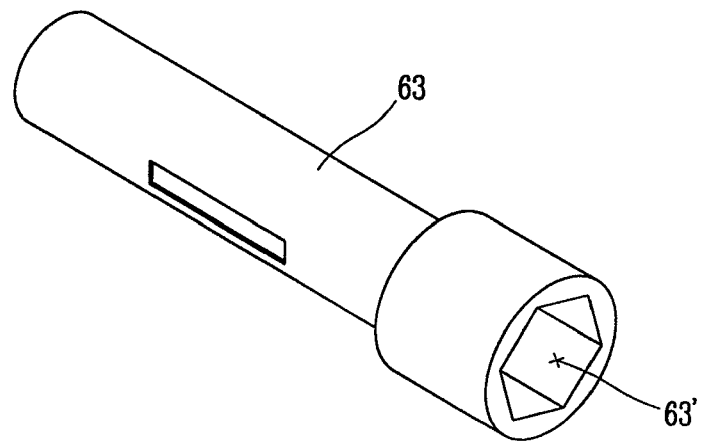
FIG. 11B is a exploded perspective view of FIG. 10A.

As shown in FIGS. 11A and 11B, a protruding axis region 76 of the rotator 75 and the insulating shaft 71 have a hexagonal section, respectively. Also, a connection hole 63' having a hexagonal section is formed at an axis-receiving region (not shown, refer to FIG. 10C) of an opposite surface to a surface of the rotator 75 where the protruding axis region 76, and at the end of the main rotation axis 63.

A configuration and operation of the driving source assembly 61 of the disconnection switch 100 will be explained with reference to FIGS. 12A and 12B.

Figure 12A:
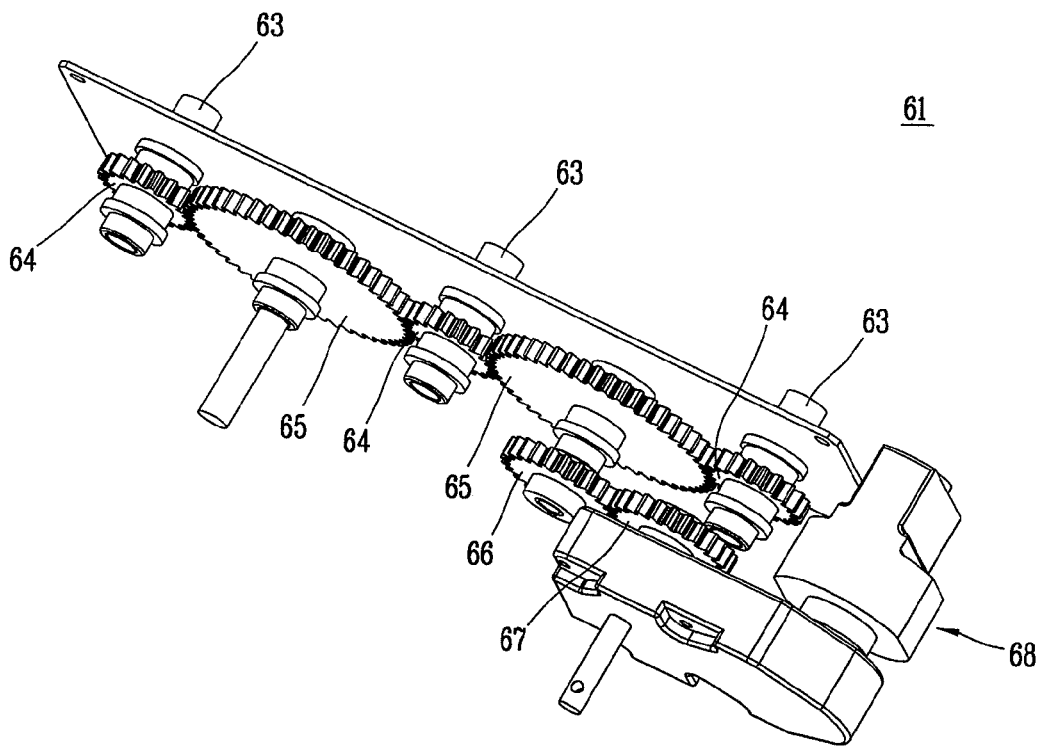
FIG. 12A is a perspective view showing a driving mechanism of FIG. 4B.
Figure 12B:
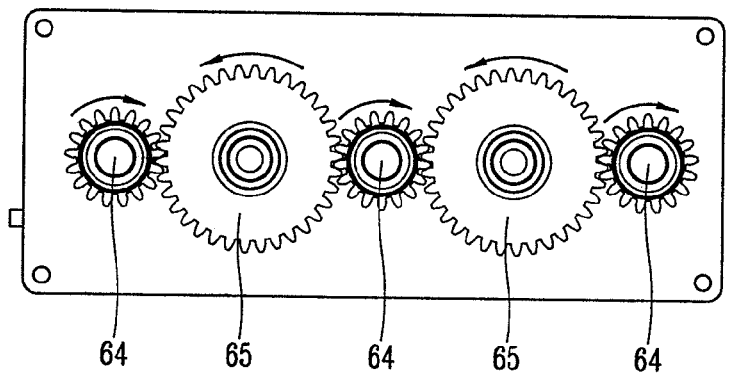
FIG. 12B is a conceptual view showing an operation of the driving mechanism of FIG. 12A.

Referring to FIGS. 12A and 12B, three disconnection switches 100 are disposed in parallel in correspondence with a three-phases (R, S, T) of AC circuit The driving source assembly 61 includes three main rotation gears 64, two auxiliary gears 65, and a driving motor 68 for supplying power.

The main rotation gears 64 are respectively coupled to the main rotation axis 63 connected to the protruding axis region 76 of the rotator 75. The auxiliary gear 65 is engaged between the main rotation gears 64 so as to allow the three main rotation gears 64 to have the same rotation direction (refer to FIG. 12B).

A driving gear 67 rotates a connection gear 66 by receiving power from the driving motor 68, and the connection gear 66 is disposed on the same axis as one of the auxiliary gears 65.

The disconnection switch according to the present invention is covered with an insulating solid material except for the driving source assembly differently from the conventional art. It is possible to reduce the size of the disconnection switch by largely lengthening the surface insulating distance, even if a linear length of the insulating solid material is made short.

Since main components are assembled to each other, an entire assembly is simplified. Furthermore, since an insulating solid material is used instead of SF6 gas Which is the main culprit increasing the atmosphere temperature, an eco-friendly characteristic is enhanced. Since the SF6 gas is not used, a gas pressure need not be checked and an additional operation to gas supply to compensate for gas leakage, or the like is not required thus to save the maintenance cost.

When the disconnection switch is useful in adopting a double main buses, it has an excellent compatibility.

That is, in the conventional art, two disconnection switches are disposed in parallel with each other to use the double main buses. The two disconnection switches are connected to each other by a connection pipe in which gas is contained, thereby requiring an additional operation.

However, in the disconnection switch of the present invention, an additional component such as the connection pipe is not required. Furthermore, since an entire size of the disconnection switch is decreased, the disconnection switch may be disposed in upper and lower directions not in parallel.

Hereinafter, a switchgear using the disconnection switch according to the present invention will be explained.

Figure 13A:
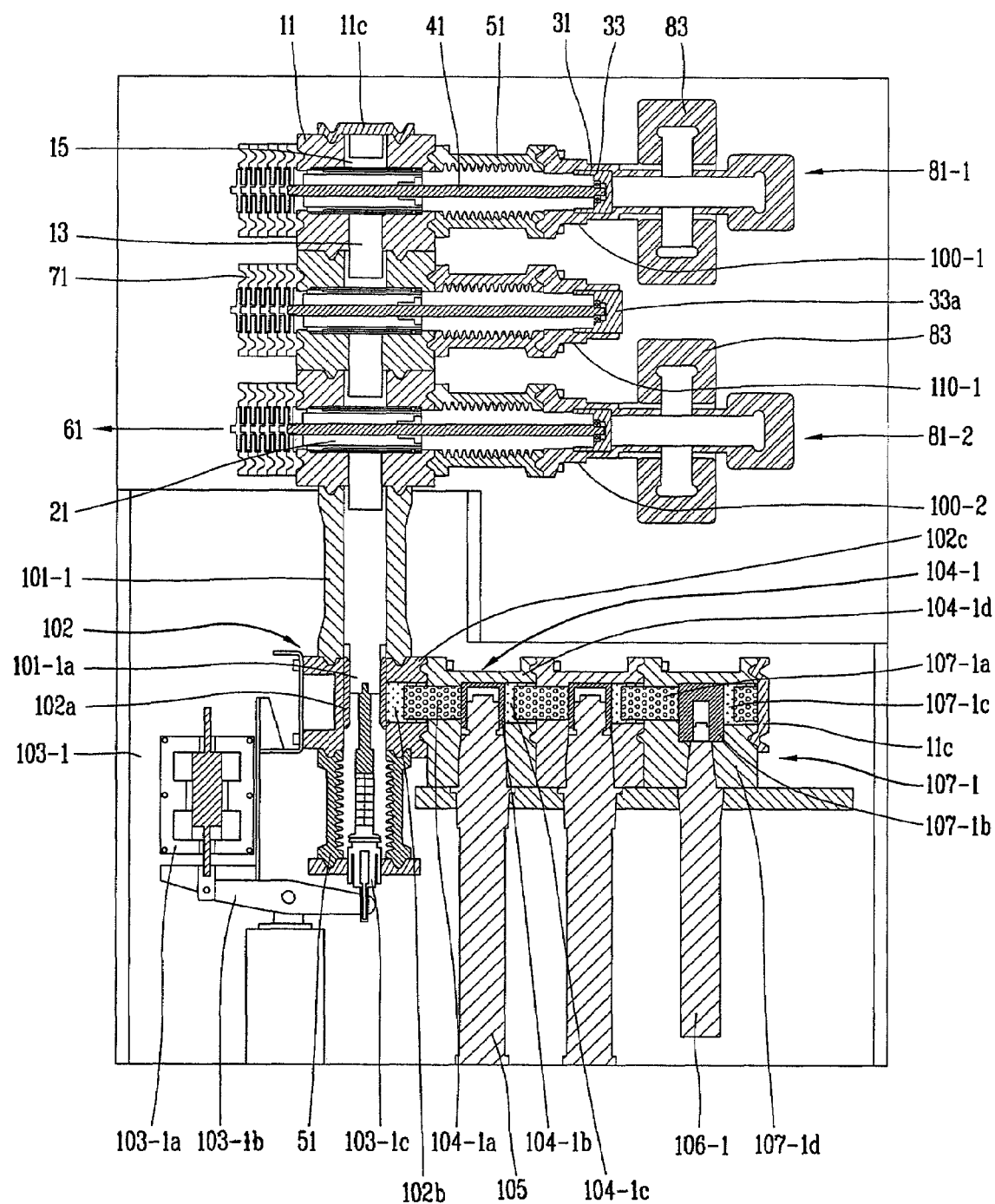
FIG. 13A is a sectional view showing the main unit according to the present invention.
Figure 13B:
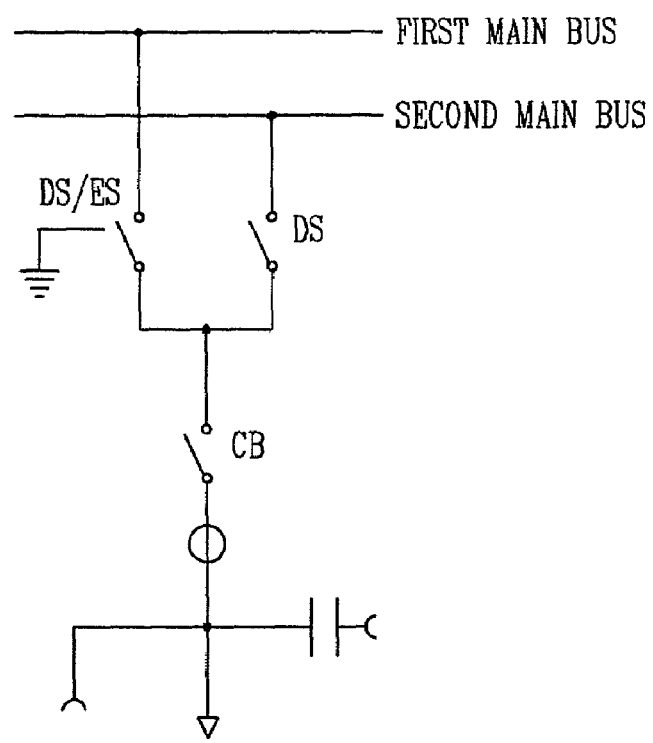
FIG. 13B is a circuit view showing the main unit according the present invention.

FIG. 13A is a sectional view showing the main unit according to the present invention, and FIG. 13B is a circuit view showing the main unit according the present invention.

A main unit of the switchgear according to the present invention will be explained with reference to FIGS. 13A and 13B.

As shown in FIG. 13A, the main unit of the switchgear includes a first main bus connection portion 81-1 to which one power side first main bus is connected; a second main bus connection portion 81-2 to which another power side second main bus is connected; a first disconnection switch 100-1 electrically connected to the first main bus connection portion 81-1 or separated from the first main bus connection portion 81-1; a second disconnection switch 100-2 electrically connected to the second main bus connection portion 81-2 or separated from the second main bus connection portion 81-2; a first earth switch 110-1 for electrically connecting the first disconnection switch 100-1 and the second disconnection switch 100-2 to each other, and switching to a position to ground and to a position to be separated from the earth; a first circuit breaker 101-1 electrically connected to the second disconnect switch 100-2, for connecting or breaking a conducting path from the second disconnection switch 100-2; a driving mechanism 103-1 for driving the first circuit breaker 101-1 to a position to connect or break the conducting path; and a cable socket 104-1 electrically connected to the first circuit breaker 101-1, and having a socket portion electrically connected to a load side cable 105.

When the switchgear is used for a three-phase AC, parts of the switchgear are disposed in three parallel groups so as to correspond to a three-phase AC main bus and a three-phase AC load cable.

The first main bus connection portion 81-1 and the second main bus connection portion 81-2 have the same construction as the main bus connection portion 81 of FIG. 8, and have a bus bar 83 for electrical connection to the main bus or other components.

Each of the first disconnection switch 100-1, the second disconnection switch 100-2, and the first earth switch 110-1 comprises: a base frame 11 tunneled in one direction, having a load connection portion for electrically connecting to an electrical load(not shown), and formed of an insulating solid material to surround the load connection portion; a driving source assembly 61 that provides rotating dynamic power source; an insulating shaft 41 formed of an insulating material, rotated by the rotating dynamic power from the driving source assembly 61, and having a thread portion on an outer circumferential surface thereof; a stationary contactor 31 electrically connected to one of the first main bus connection portion 81-1 and the second main bus connection portion 81-2, and having a fixed contact 33 or 33a surrounded by an insulating solid material; a movable contactor. 21 engaged with the insulating shaft 41 in mesh, electrically connected to the load connection portion of the base frame 11, and linearly movable to a position contacting to the fixed contact 33 or 33a of the stationary contactor 31 and a position separated from the fixed contact 33 or 33a of the stationary contactor 31 in accordance with the rotation of the insulating shaft 41; an insulating spacer 51 disposed between the base frame 11 and the stationary contactor 31 to secure an electric insulation, and formed of an insulating solid material having a cavity therein to allow the movable contactor 21 to move through; and a power transferring assembly 71 disposed between the driving source assembly 61 and the insulating shaft 41, which transfers the rotating power provided from the driving source assembly 61 to the insulating shaft 41, and which electrically insulates the driving source assembly 61 and the base frame 11 from each other.

The first disconnection switch 100-1, the second disconnection switch 100-2, and the first earth switch 110-1 are formed of the same standardized parts that can be interchangeable to each other, i.e., the base frame 11, the driving source assembly 61, the insulating shaft 41, the stationary contactor 31, the movable contactor 21, the insulating spacer 51, and the power transferring assembly 71.

For instance, the base frame 11 of the first disconnection switch 100-1 can serve as the base frame of the second disconnection switch 100-2, or as the base frame of the first earth switch 110-1.

The first disconnection switch 100-1, the second disconnection switch 100-2, and the first earth switch 110-1 can be comprised as one module formed of the base frame 11, the driving source assembly 61, the insulating shaft 41, the stationary contactor 31, the movable contactor 21, the insulating spacer 51, and the power transferring assembly 71.

Herein, the first-main bus connection portion 81-1 to which the first main bus is connected is connected to the first disconnection switch 100-1, the second main bus connection portion 81-2 to which the second main bus is connected is connected to the second disconnection switch 100-2, and the fixed contact 33a is grounded to a module of the first earth switch 110-1. That is, corresponding part connected with each of the modules is only changed according to the function of the each module.

A detail description of the construction and operation for the first disconnection switch 100-1, the second disconnection switch 100-2, and the first earth switch 110-1 can be referred to above mentioned explanation of the disconnection switch 100 according to the present invention and it has already been described in detail, so it was omitted for avoiding repetition.

A conductor, a concave connection portion 15(refer to FIG. 7) of the base frame 11 of the first disconnection switch 100-1 is covered by an insulating cover 11C formed of an insulating material so as to prevent an electrical shortage accident from occurring as the concave connection portion 15 is exposed out. The insulating cover 11C and the concave connection portion 15 of the base frame 11 can be connected to each other by coupling a concave portion formed at a periphery of the concave connection portion 15 to a protruding portion formed at the insulating cover 11C.

The insulating cover 11C may be used as one standardized part thus to insulate an exposed portion of another component.

An electrical connection between the first disconnection switch 100-1 and the first earth switch 110-1, and between the first earth switch 110-1 and the second disconnection switch 100-2 may be achieved by fitting the protruding connection portion 13 (refer to FIG. 7) into the concave connection portion 15 of the base frame 11.

The first circuit breaker 101-1 may be implemented as a vacuum interrupter (so called as abbreviation "VI").

The vacuum interrupter includes a vacuum container; a fixed contact fixedly disposed in the vacuum container, electrically connected to an electrical power source side, and formed of a conductive material; and a movable contact electrically connected to an electrical load side, formed of a conductive material, and movable to a position to form a closed circuit between the power source side and the load side by contacting to the fixed contact or to a position to form an opened circuit between the power source side and the load side by being separated from the fixed contact. Herein, an outer surface of the first circuit breaker 101-1 is implemented as a mold casing formed of a solid insulating material such as epoxy.

The fixed contact of the first circuit breaker 101-1 is electrically connected to the load connection portion of the base frame 11 (i.e, the protruding connection portion 13). The first circuit breaker 101-1 is a standardized part or component, and may be substituted by another one having the same construction in a feeder unit, a section unit, and a tie unit as well as the main unit.

The first circuit breaker 101-1 and the second disconnection switch 100-2 can be electrically connected to each other by disposing a concave connector (not shown) formed of a conductive material and electrically connected to the fixed contact at an upper side of the vacuum interrupter, and then by fitting the protruding connection portion 13 of the base frame 11 of the second disconnection switch 100-2 into the concave connection portion.

The first circuit breaker 101-1 is electrically connected to the cable socket 104-1 by a connector 102. More concretely, a power transferring conductor 101-1a is connected between the movable contact of the first circuit breaker 101-1 and a connection rod 103-1c, thereby transmitting a linear power generated from the connection rod 103-1c to the movable contact. The connector 102 has a ring-shaped conductor portion 102a therein, and an outer circumferential surface of the power transferring conductor 101-1a is electrically connected to an inner circumferential surface of the conductor portion 102a. The connector 102 is electrically connected to the cable socket 104-1 by a concave connector 102b provided at the connector 102 so as to be electrically connected to the conductor portion 102a. More concretely, the connector 102 has the conductor portion 102a, the concave connector 102b electrically connected to the conductor portion 102a, and a mold casing 102c formed of an insulating material such as epoxy.

A conducting path is formed from the movable contact of the first circuit breaker 101-1 to the cable socket 104-1 sequentially via the power transferring conductor 101-1a, the conductor portion 102a of the conductor 102, and the concave connector 102b.

The insulating spacer 51 is connected to a lower side of the connector 102 so that the connection rod 103-1c can pass through the insulating spacer 51. The insulating spacer 51 serves to insulate the connection rod 103-1c from outside. The insulating spacer 51 of the connector 102 is implemented as the same standardized part as the insulating spacer 51 of the first disconnection switch 100-1, the second disconnection switch 100-2, and the first earth switch 110-1, thereby facilitating production, installation and maintenance.

The cable socket 104-1 includes a conductor portion, and a first mold casing portion 104-1d formed of an insulating solid material such as epoxy for insulating the conductor portion from outside. The conductor portion includes a first protruding connector 104-1a electrically connected to the connector 102 and formed of a conductive material, a first central concave connector 104-1b electrically connected to the first protruding connector 104-1a and formed of a conductive material connected to the conductor of the cable 105, and a first concave connector 104-1c disposed at a facing side of the first central concave connector 104-1b so as to be additionally connected to another socket, and electrically connected to the first central concave connector 104-1b.

A thread portion is provided at the first central concave connector 104-1b of the cable socket 104-1 connected to the conductor of the cable 105, thereby being connected to a corresponding thread portion provided at the end of the cable 105.

A second lightning arrestor socket 107-2 includes a fourth conductor portion, and a fourth mold casing portion 107-2d formed of an insulating solid material for insulating the fourth conductor portion from outside. The fourth conductor portion includes a fourth protruding connector (reference numeral not designated, refer to similar part 107-1a in FIG. 13A) formed of a conductive material; a fourth central concave connector (reference numeral not designated, refer to similar part 107-1b in FIG. 13A) connected to a second lighting arrestor 106-2, and formed of a conductive material connected to the fourth protruding connector; and a fourth concave connector (reference numeral not designated, refer to similar part 107-1c in FIG. 13A) disposed at a facing side of the fourth protruding connector, and formed of a conductive material so as to be connected to another socket.

A thread portion is provided at the fourth central concave connector connected to a conductor of the second lighting arrestor 106-2 of the second lighting arrestor socket 107-2, thereby being connected to a corresponding thread portion provided at the end of the second lighting arrestor 106-2.

The feeder unit has the same construction as the main unit except the number of cables 105 and the cable sockets 104-2, and thus its detail repeated explanation will be omitted.

Figure 14A:
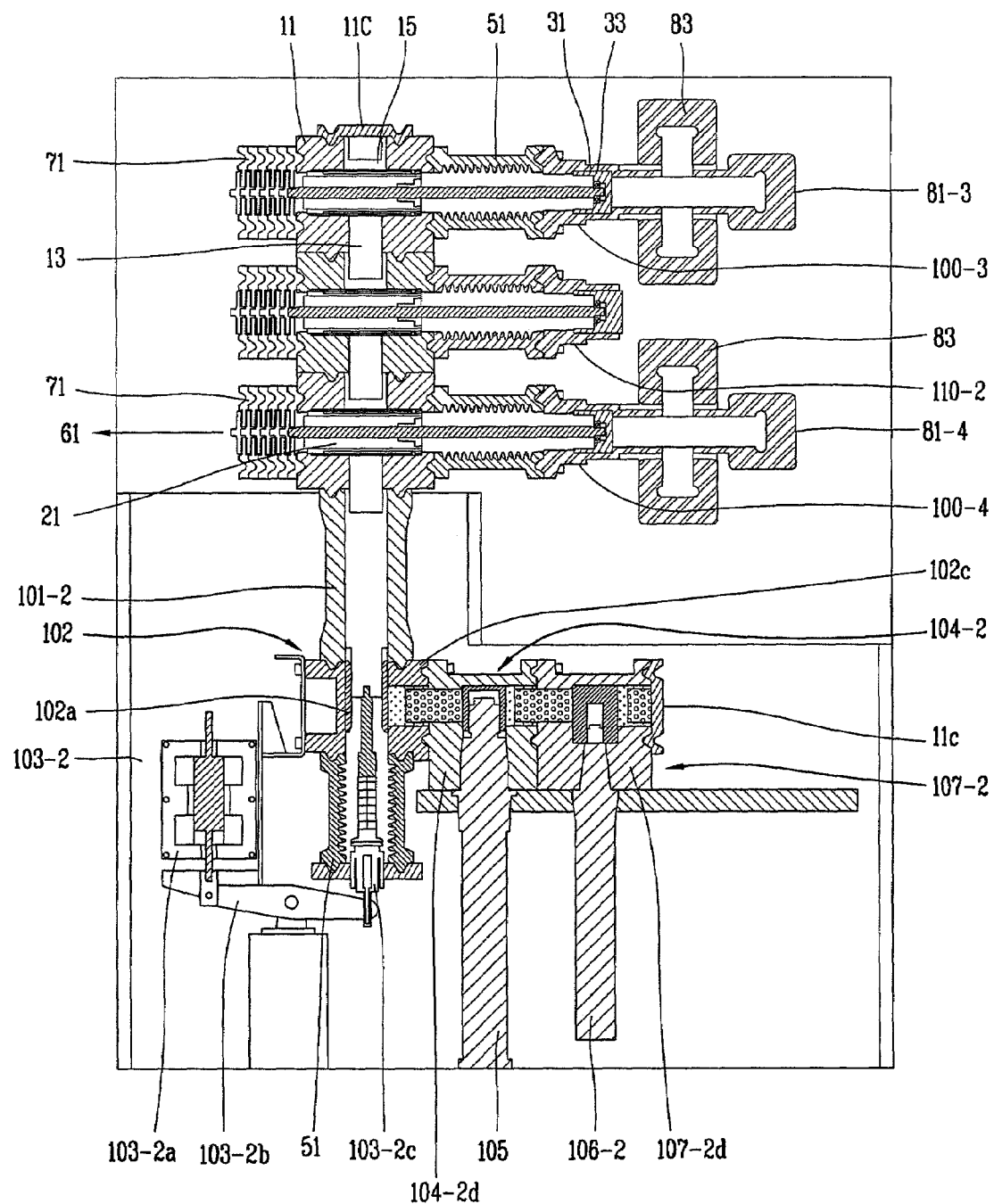
FIG. 14A is a sectional view showing a feeder unit according the present invention.
Figure 14B:
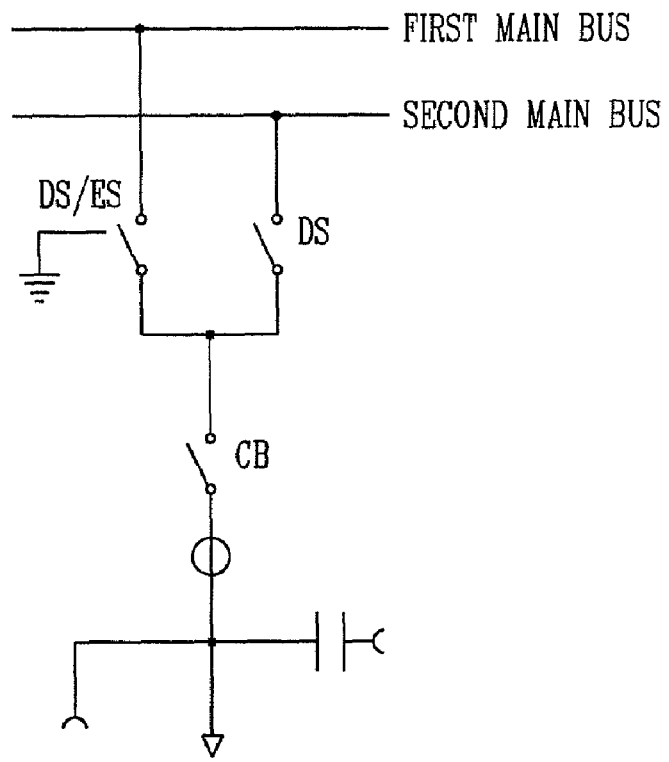
FIG. 14B is a circuit view showing the feeder unit according to the present invention.

The circuit diagram of the feeder unit shown on FIG. 14B has the same as the circuit diagram of the main unit shown on FIG. 13B, and thus its explanation will be omitted.

The feeder unit has the same operation as the main unit, and thus its explanation will be omitted.

A measuring unit of the solid-insulated switchgear according to the present invention will be explained with reference to FIGS. 15A and 15B.

Figure 15A:
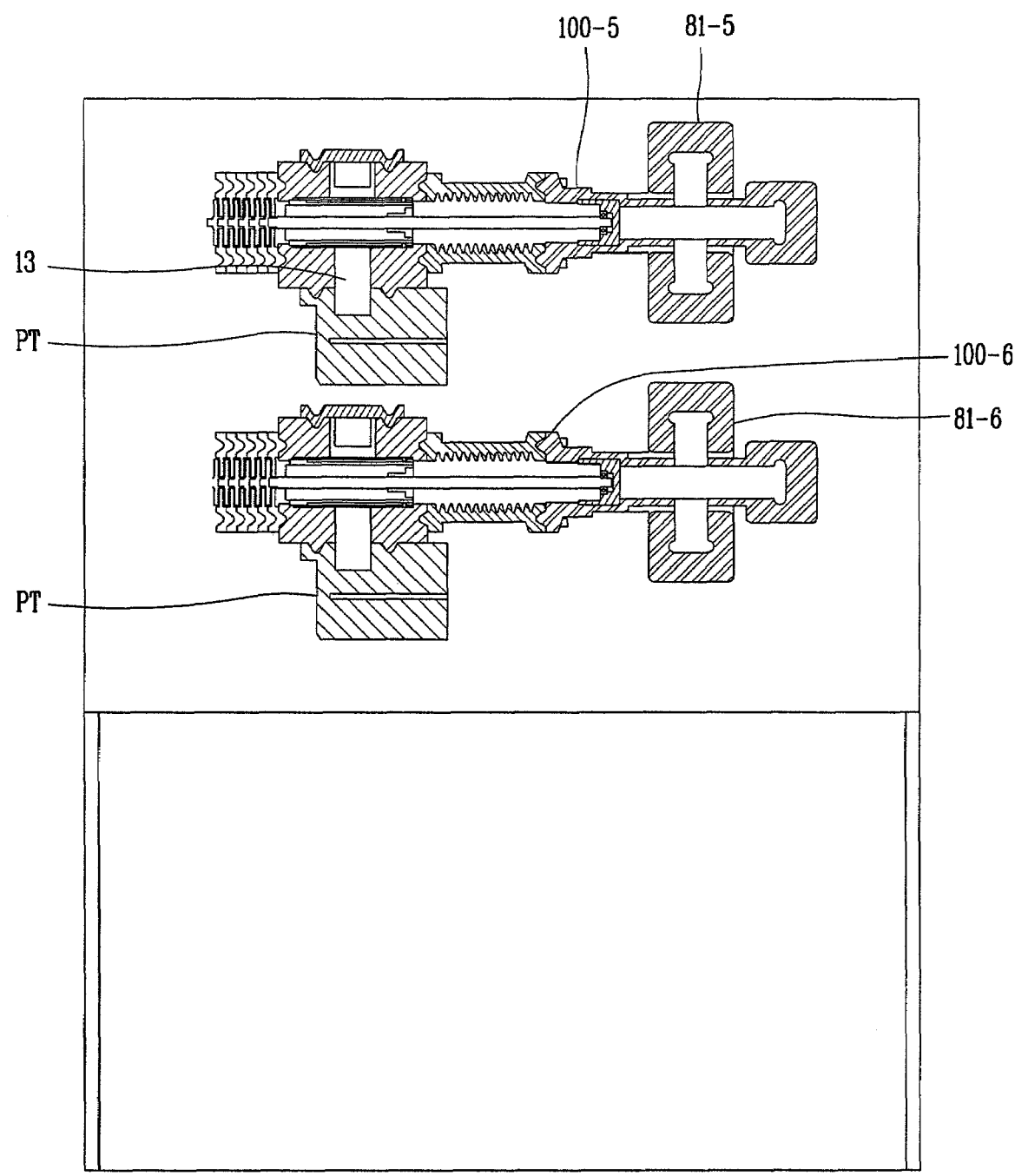
FIG. 15A is a sectional view showing a measuring unit according the present invention.
Figure 15B:
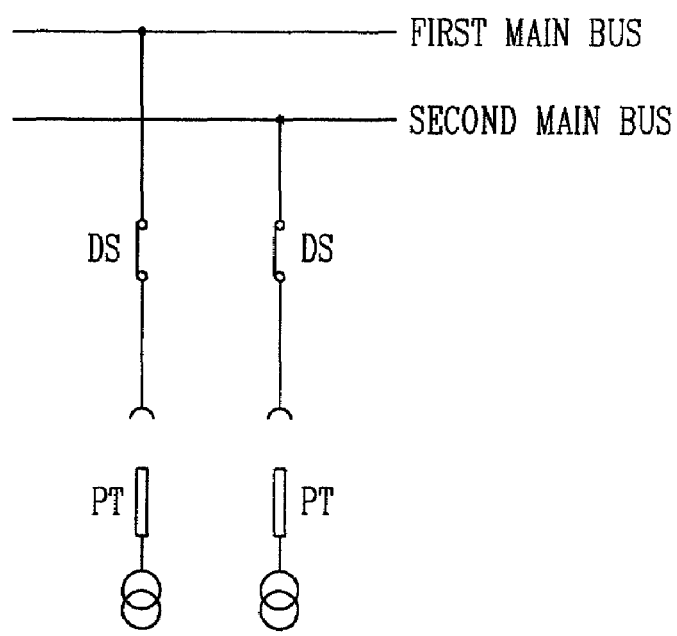
FIG. 15B is a circuit view showing the measuring unit according to the present invention.

FIG. 15A is a sectional view showing the measuring unit according the present invention, and FIG. 15B is a circuit view showing the measuring unit according to the present invention.

The measuring unit of the solid-insulated switchgear according to the present invention serves to measure each electrical potential of the first and second main buses.

The measuring unit includes a fifth main bus connection portion 81-5 to which the first main bus is connected; a sixth main bus connection portion 81-6 to which the second main bus is connected; a fifth disconnection switch 100-5 and a sixth disconnection switch 100-6 respectively connected to the fifth main bus connection portion 81-5 and the sixth main bus connection portion 81-6, and having parts interchangeable with the parts of the first disconnection switch 100-1; and a potential transformer (PT) electrically connected to the fifth disconnection switch 100-5 and the sixth disconnection switch 100-6, for measuring an electrical potential between the first main bus and a load side and between the second main bus and the load side, respectively.

The potential transformer (abbreviated as PT hereinafter) is implemented as a plug-in type PT having a potential measuring circuit provided at the protruding connection portion 13 for measuring a potential when the protruding connection portion 13 of each base-frame (reference numeral not designated, refer to similar part 11 of FIG. 13A) of the fifth disconnection switch 100-5 and the sixth disconnection switch 100-6 is inserted thereinto.

The electrical potentials of the first and second main buses measured by the PT of the measuring unit are outputted to the controller, and can be displayed.

Referring to FIG. 15B, the two disconnection switches designate the fifth disconnection switch 100-5 and the sixth disconnection switch 100-6, and are respectively connected to the PT.

A section unit that may be included in the solid-insulated switchgear according to the present invention will be explained with reference to FIGS. 16A and 16B.

The section unit serves to separate one of the main buses from the circuit. The solid insulated switchgear includes 2 sets of one disconnection switch and one earth switch and the 2 sets are connected to each other at a lower side thereof. The section unit has a length corresponding to two times of that of the main unit, the feeder unit, and the measuring unit. That is, in a preferred embodiment according to the present invention, the length of the main unit, the feeder unit, and the measuring unit was 600 millimeter, and the length of the section unit was 1200 millimeter.

The section unit of the solid-insulated switchgear includes a seventh main bus connection portion 81-7 connected to the second main bus; a seventh disconnection switch 100-7 electrically connected to or separated from the seventh main bus connection portion 81-7, and having parts interchangeable with the parts of the first disconnection switch 100-1; a third earth switch 110-3 electrically connected to the seventh disconnection switch 100-7, switchable to a position grounded and a position separated from the earth, and having parts interchangeable with the parts of the first disconnection switch 100-1, in which the part corresponding to the fixed contact (refer to 33 of FIG. 13A) of the first disconnection switch 100-1 is connected to the earth; a third circuit breaker 101-3 electrically connected to the seventh disconnection switch 100-7, for connecting or breaking a conducting path from the seventh disconnection switch 100-7; a third driving mechanism 103-3 for driving the third circuit breaker 101-3 to a position to connect or break the circuit; an eighth main bus connection portion 81-8 electrically connected to the third circuit breaker 101-3; a ninth main bus connection portion 81-9 connected to the second main bus; an eighth disconnection switch 100-8 electrically connected to or separated from the ninth main bus connection portion 81-9, and having parts interchangeable with the parts of the first disconnection switch 100-1; a fourth earth switch 110-4 electrically connected to the eighth disconnection switch 100-8, switchable to a position grounded and a position separated from the earth, and having parts interchangeable with the parts of the first disconnection switch 100-1, in which part corresponding to the fixed contact (refer to 33 of FIG. 13A) of the first disconnection switch 100-1 are connected to the earth; and a tenth main bus connection portion 81-10 electrically connected to the eighth disconnection switch 100-8, and electrically connected to the eighth main bus connection portion 81-8.

Referring to FIG. 16A, although it was shown for facilitation that the eighth main bus connection portion 81-8 and the tenth main bus connection portion 81-10 are separated from each other, actually they are always electrically connected to each other by a connecting conductor such as a bus bar(not shown).

Referring to FIG. 16A, a part or component connected to a lower portion of the eighth disconnection switch 100-8 is a conductive connecting part not a circuit breaker. The conductive connecting part is implemented as a solid-insulated casing having no vacuum interrupter therein, but having a conductor portion therein. An outer surface of the conductor portion is molded by a solid-insulating material such as epoxy. If the conductor portion is formed of a conductor having the physically same size and shape as a vacuum interrupter, as to the solid-insulated casing, a mold for the solid-insulated casing of the conductor portion can also be used as the one for the solid-insulated casing of the circuit breaker, so it is possible that the conductive connecting part substituted for the circuit breaker can be produced as standardized part having the same physical shape and size as the circuit breaker. Accordingly, the conductive connecting part can be rapidly manufactured with a low cost, and the section unit and the solid-insulated switchgear can be simply manufactured.

The connector 102 of FIG. 13A of the main unit connected to a lower portion of the conductive connecting part has no further component connected to a lower portion thereof. Accordingly, the connector is covered by an insulating cover 11C for insulating the connector from another component.

The more detail construction of the seventh disconnection switch 100-7, the eighth disconnection switch 100-8, the third earth switch 110-3, and the fourth earth switch 110-4 can be referred to the above mentioned detail description about the disconnection switch 100 of the present invention with reference to FIGS. 3 to 10B, so the detail description will be omitted for avoiding repetition.

Since the third disconnection switch 101-3 and the driving mechanism 103-3 are aforementioned in the main unit, detail explanation thereof will be omitted for avoiding repetition.

Figure 16B:
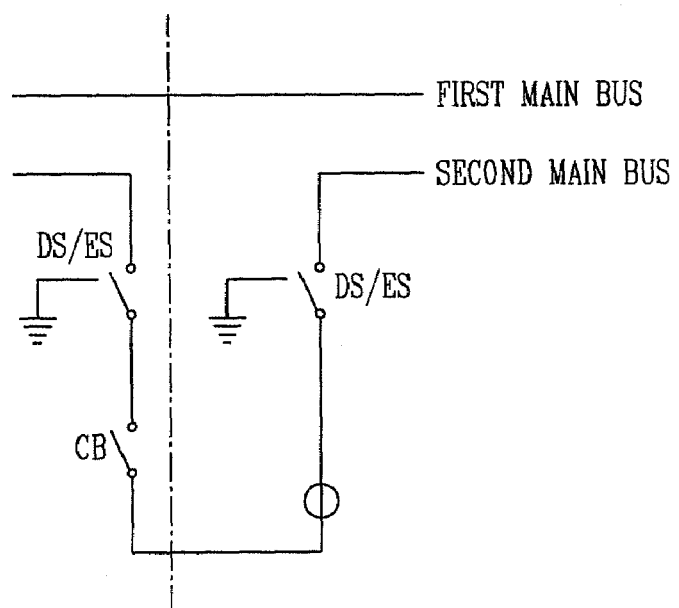
FIG. 16B is a circuit view showing the section unit according to the present invention.

Referring to FIG. 16B, the second main bus, the seventh disconnection switch 100-7 of the section unit, the third earth switch 110-3, the third disconnection switch 101-3, the eighth disconnection switch 100-8, and the fourth earth switch 110-4 are serially connected to one another. When one of the seventh disconnection switch 100-7, the eighth disconnection switch 100-8, and the third circuit breaker 101-3 is operated to a position to break the circuit, the second main bus is broken thus to be separated from the circuit.

Operations of the section unit, that is, operating the disconnection switch to a position for connecting or breaking the circuit, operating the earth switch to a connecting or grounding position, and operating the circuit breaker to a position for breaking the circuit were aforementioned in the main unit, and thus its detail explanation will be omitted for avoiding repetition.

Referring to FIG. 16B, the left DS/ES represents the seventh disconnection switch 100-7 and the third earth switch 110-3, the right DS/ES represents the eighth disconnection switch 100-8 and the fourth earth switch 110-4, and the CB indicates the third circuit breaker 101-3.

A tie unit that may be included in the solid-insulated switchgear according to the present invention will be explained with reference to FIGS. 1 7A and 1 7B.

The tie unit serves to connect 2 different main buses such as the first main bus and the second main bus to each other.

The tie unit has two sets of disconnection switch and earth and the two sets are connected to each other at a lower side thereof. The two main buses are connected to each other by the tie unit, the tie unit has a length corresponding to two times of that of the main unit or the feeder unit or the measuring unit. That is, in the preferred embodiment of the present invention, the respective length of the main unit, the feeder unit or the measuring unit was approximately 600 millimeter, and the length of the tie unit was approximately 1200 millimeter.

The tie unit according to the present invention includes: an eleventh main bus connection portion 81-11 connected to the second main bus; a ninth disconnection switch 100-9 electrically separated from or connected to the eleventh main bus connection portion 81-11, and having parts interchangeable with the parts of the first disconnection switch 100-1; a fifth earth switch 110-5 electrically connected to the ninth disconnection switch 100-9, switchable to a position grounded or a position separated from the earth, and having parts interchangeable with the parts of the first disconnection switch 100-1, in which a part corresponding to the fixed contact (refer to 33 of FIG. 13A) of the first disconnection switch 100-1 is connected to the earth; a fourth circuit breaker 103-4 electrically connected to the ninth disconnection switch 100-9, for conducting or breaking a conducting path from the ninth disconnection switch 100-9; a fourth driving mechanism 103-4 for driving the fourth circuit breaker 103-4 to a connecting position or a breaking position; a twelfth main bus connection portion 81-12 electrically connected to the fourth circuit breaker 103-4; a thirteenth main bus connection portion 81-13 connected to the first main bus; a tenth disconnection switch 100-10 electrically connected to or separated from the thirteenth main bus connection portion 81-13, and having parts interchangeable with the parts of the first disconnection switch 100-1; a sixth earth switch 110-6 electrically connected to the tenth disconnection switch 100-10, switchable to a position grounded or a position separated from the earth, and having parts interchangeable with the parts of the first disconnection switch 100-1, in which a part corresponding to the fixed contact (refer to 33 of FIG. 13A) of the first disconnection switch 100-1 is connected to the earth; and a fourteenth main bus connection portion 81-14 electrically connected to the sixth earth switch 110-6, and electrically connected to the twelfth main bus connection portion 81-12.

Figure 17A:
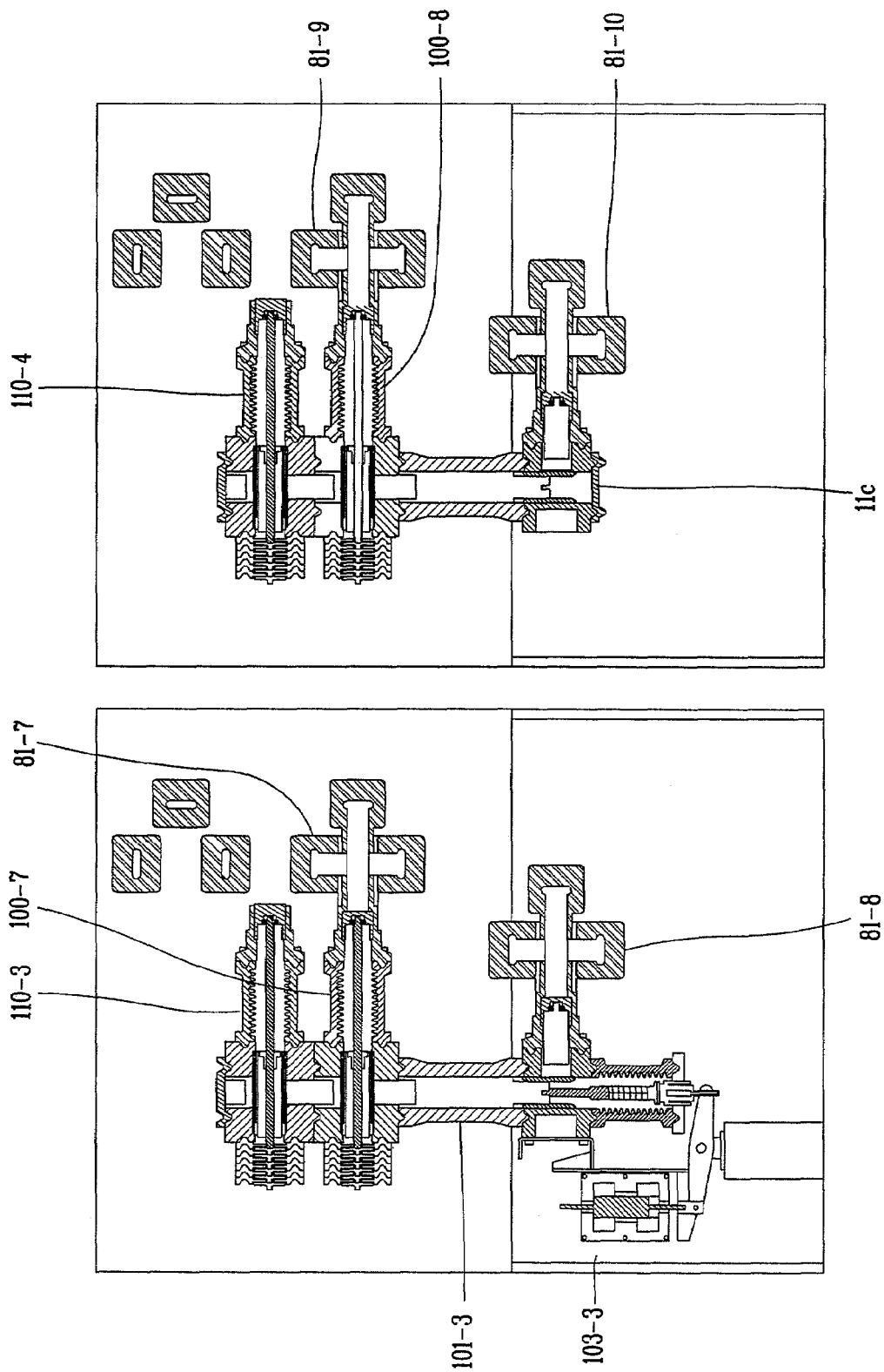
FIG. 17A is a sectional view showing a tie unit according the present invention.
Figure 17B:
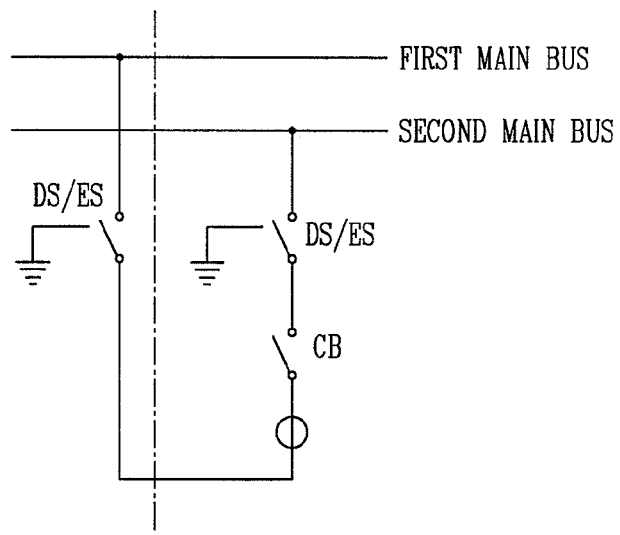
FIG. 17B is a circuit view showing the tie unit according to the present invention.

Referring to FIG. 17A, although the twelfth main bus connection portion 81-12 and the fourteenth main bus connection portion 81-14 are shown as separated from each other for facilitation of depiction, actually they are always electrically connected to each other by a connecting conductor such as a bus bar (not shown).

Referring to FIG. 17A, a component connected to a lower portion of the sixth disconnection switch 110-6 is a conductive connecting part 101a not a circuit breaker. The conductive connecting part 101a is implemented as a solid-insulated casing having no vacuum interrupter therein, but having a conductor portion therein. An outer surface of the conductor portion is molded by a solid-insulating material such as epoxy. If the conductor portion is formed of a conductor having the physically same size and shape as a vacuum interrupter, a mold for the solid-insulated casing of the conductor portion can also be used as the one for the solid-insulated casing of the circuit breaker, so it is possible that the conductive connecting part substituted for the circuit breaker can be produced as standardized part having the same physical shape and size as the circuit breaker. Accordingly, the conductive connecting part 101a can be rapidly manufactured with a low cost, and the tie unit and the solid-insulated switchgear can be simply manufactured.

The connector 102 aforementioned in the main unit connected to a lower portion of the conductive connecting part 101a has no further connecting component at a lower side thereof. Accordingly, the connector 102 is covered by an insulating cover 11C for insulating the connector 102 from another component.

A conductor portion and a mold casing portion are connected between the conductive connecting part 101a and the sixth earth switch 110-6. The conductor portion includes a conductive concave connector (not shown), and a conductive protruding connector (not shown) connected to the conductive concave connector. The mold casing portion which surrounds an outer side of the conductor portion is formed of an insulating solid material such as epoxy.

The more detail construction of ninth disconnection switch 100-9, the tenth disconnection switch 100-10, the fifth earth switch 110-5, and the sixth earth switch 110-6 can be referred to the above mentioned detail description about the disconnection switch 100 of the present invention with reference to FIGS. 3 to 10B, so the detail description will be omitted for avoiding repetition.

Since the fourth disconnection switch 101-4 and the fourth driving mechanism 103-4 are aforementioned in the main unit, detail explanation thereof will be omitted for avoiding repetition.

Referring to FIG. 16B, the right DS/ES represents the ninth disconnection switch 100-9 and the fifth earth switch 110-5 each connected to the second main bus, the left DS/ES represents the tenth disconnection switch 100-10 and the sixth earth switch 110-6 each connected to the first main bus, and the CB represents the fourth circuit breaker 101-4.

The tie unit that may be included in the solid-insulated switchgear according to the present invention serves to electrically connect the first main bus and the second main bus to each other. Operation for connecting or separating the first and second main buses to or from each other will be explained.

The movable contactors(refer to numeral 21 of FIG. 13A) inside the fifth earth switch 110-5 and the sixth earth switch 110-6 are separated from the fixed contacts(refer to numeral 33a of FIG. 13A) to a position of connecting a circuit. The ninth disconnection switch 100-9 is operated so that the movable contactor (refer to 21 of FIG., 13A) can contact the fixed contact (refer to numeral 33 of FIG. 13A), thereby being electrically connected to the second main bus. The fourth circuit breaker 101-4 is operated so that the movable contact contacts the fixed contact. Accordingly, the first main bus and the second main bus are electrically connected to each other.

On the other hand, if the movable contact of the ninth disconnection switch 100-9 or the tenth disconnection switch 100-10 is separated from the fixed contact, or if the movable contact of the fourth circuit breaker 101-4 is separated from the fixed contact, the first main bus and the second main bus are separated from each other.

Operation of the tie unit, that is, operating the disconnection switch to a position for conducting or breaking the circuit, operating the earth switch to a connecting or grounding position, and operating the circuit breaker to a position for breaking the circuit were aforementioned in the main unit, and thus its detail explanation will be omitted.

Figure 18:
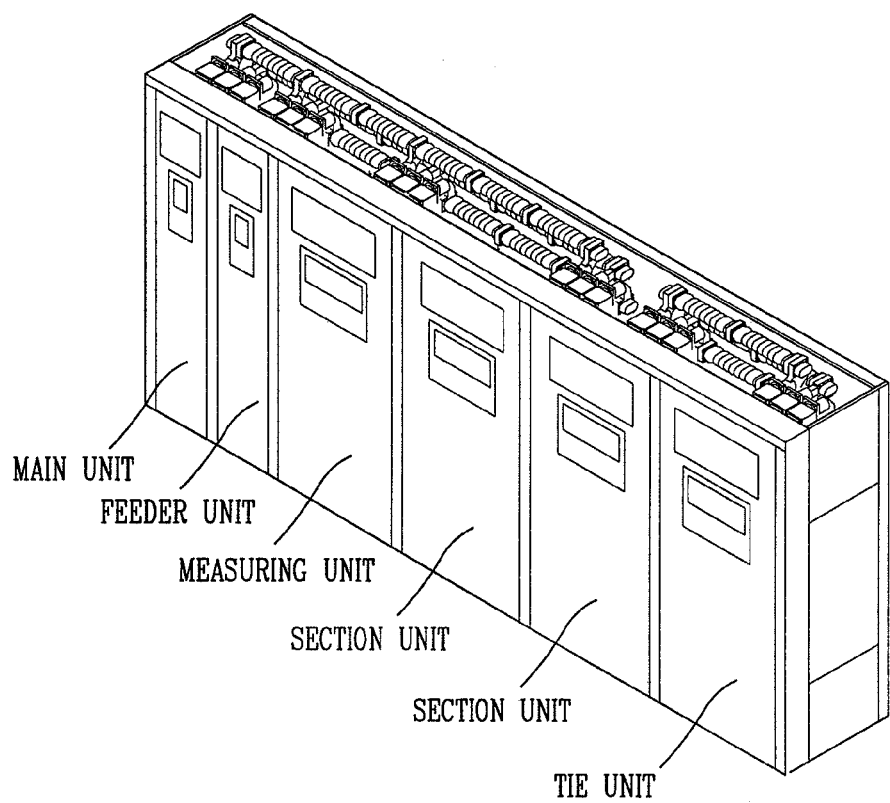
FIG. 18 is a perspective view showing the switchgear composed of one main unit, one feeder unit, one measuring unit, two section units, and one tie unit according to the present invention.

FIG. 18 is a perspective view showing the switchgear comprised of one main unit, one feeder unit, one measuring unit, two section units, and one tie unit according to the present invention.

Referring to FIG. 18, the reason why the measuring unit is as wide as the section unit or the tie unit is because the disconnection switch for the first main bus and the disconnection switch for the second main bus are not disposed in upper and lower direction shown as in FIG. 15A but are disposed horizontally that is, in right and left direction.

As aforementioned, the solid-insulated disconnection switch according to the present invention is formed of an insulating solid material. Accordingly, a surface insulating distance is increased even if a straight length of the insulating solid material is made short. Also, since main parts are produced as assemblies, the solid-insulated disconnection switch can be simplified and minimized. The solid-insulated disconnection switch can have high compatibility and reliability, and an eco-friendly characteristic is enhanced.

The solid-insulated switchgear using the solid-insulated disconnection switch can have an eco-friendly characteristic and a small size by solid-insulating each unit, a disconnection switches and earth switch constituting each unit.

In the solid-insulated switchgear according to the present invention, each unit and each part constituting each unit are standardized so as to be interchangeable to each other, thereby implementing a simple manufacture.

Furthermore, the solid-insulated switchgear can be manufactured according to an installation environment and a user's various demands, and can have an enhanced maintenance/repair characteristic.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What are claimed are:

1. A solid insulated switchgear having a main unit for receiving electric power, the main unit comprising:
    a first main bus connection portion to which a first main bus for one power source is connected;
    a second main bus connection portion to which a second main bus for another power source is connected;
    a first disconnection switch electrically connected to or separated from the first main bus connection portion, wherein the first disconnection switch comprising a base frame tunneled in one direction, having a load connection portion for electrically connecting to a load, and formed of an insulating solid material to surround the load connection portion,
    a driving source assembly which provides rotating power,
    an insulating shaft formed of an insulating material, rotated by the rotating power provided from the driving source assembly, and having a screw on an outer circumferential surface thereof,
    a stationary contactor electrically connected to the first main bus connection portion, and having a fixed contact surrounded by an insulating solid material,
    a movable contactor engaged with the insulating shaft in mesh, electrically connected to the load connection portion of the base frame, and linearly movable to a position contacting to a fixed contact of the stationary contactor or a position separated from the fixed contact of the stationary contactor in accordance with the rotation of the insulating shaft,
    an insulating spacer disposed between the base frame and the stationary contactor to secure an electric insulation, and formed of an insulating solid material having a cavity therein to allow the movable contactor to move through, and
    a power transferring assembly disposed between the driving source assembly and the insulating shaft, for transferring the rotating power generated from the driving source assembly to the insulating shaft, and electrically insulating the driving source assembly and the base frame from each other;
    a second disconnection switch having parts interchangeable with the parts of the first disconnection switch, and electrically connected to or separated from the second main bus connection portion;
    a first ground switch having parts interchangeable with the parts of the first disconnection switch, and switchable to a grounded position or a position separated from ground, for electrically connecting the first disconnection switch and the second disconnection switch to each other;
    a circuit breaker electrically connected to the second disconnection switch, for connecting or breaking a conducting path from the second disconnection switch;
    a driving mechanism for driving the circuit breaker to a connecting position or a breaking position; and
    a cable socket electrically connected to the circuit breaker, and having a socket portion electrically connected to a load side cable.

2. The solid insulated switchgear of claim 1, wherein the main unit further comprises:
    a first lightning arrestor socket electrically connected to the cable socket; and
    a first lightning arrestor having one end electrically connected to the first lightning arrestor socket, and another end grounded for grounding a lightning.

3. The solid insulated switchgear of claim 1, wherein the main unit further comprises a connector having:
    a conductor portion for electrically connecting the circuit breaker and the cable socket and
    a mold casing portion formed of an insulating solid material for insulating the conductor portion from outside,
    and wherein the cable socket comprises:
    a first conductor portion; and
    a first mold casing portion formed of an insulating solid material for insulating the conductor portion from outside,
    in which the first conductor portion includes the following parts:
    a first protruding connector formed of a conductive material electrically connected to the conductor portion of the connector;
    a first central concave connector electrically connected to the first protruding connector and formed of a conductive material connected to a conductor of the cable; and
    a first concave connector disposed at a facing side of the first central concave connector so as to be additionally connected to another socket, and electrically connected to the first central concave connector.

4. The solid insulated switchgear of claim 3, wherein a thread portion is provided at the first central concave connector of the cable socket connected to the conductor of the cable, and the thread portion is engaged with a corresponding thread portion provided at an end of the cable.

5. The solid insulated switchgear of claim 2, wherein the first lightning arrestor socket comprises:
    a conductor portion; and
    a mold casing portion formed of an insulating solid material for insulating the first conductor portion from outside,
    in which the conductor portion includes:
    a protruding connector formed of a conductive material;
    a central concave connector electrically connected to the first lightning arrestor, and formed of a conductive material electrically connected to the protruding connector; and
    a concave connector disposed at a facing side of the protruding connector, and formed of a conductive material so as to be additionally connected to another socket.

6. The solid insulated switchgear of claim 5, wherein a thread portion is provided at the central concave connector of the first lightning arrestor socket connected to the conductor of the first lightning arrestor, and is engaged with a thread portion provided at an end of the first lightning arrestor.

7. The solid insulated switchgear of claim 1, wherein the circuit breaker comprises:
   a vacuum interrupter provided with a fixed contactor electrically connected to the second disconnection switch and a movable contactor connected to the driving mechanism and movable to a position to contact with or to separated from the fixed contactor by dynamic power generated from the driving mechanism; and
   a solid insulated casing formed of an insulating solid material by molding that encloses the vacuum interrupter.

8. The solid insulated switchgear of claim 1, further comprising a feeder unit for supplying the electric power received by the main unit to a load,
   wherein the feeder unit comprises:
   a third main bus connection portion to which the first main bus is connected;
   a fourth main bus connection portion to which the second main bus is connected;
   a third disconnection switch electrically connected to or separated from the fourth main bus connection portion, and having parts interchangeable with the parts of the first disconnection switch;
   a fourth disconnection switch electrically connected to or separated from the third main bus connection portion, and having parts interchangeable with the parts of the first disconnection switch;
   a second ground switch having parts interchangeable with the parts of the first disconnection switch, and switchable to a grounded position or a position separated from ground, for electrically connecting the third disconnection switch and the fourth disconnection switch to each other, in which a part corresponding to the fixed contactor is connected to ground;
   a second circuit breaker electrically connected to the third disconnection switch, for connecting or breaking a conducting path from the third disconnection switch;
   a second driving mechanism for driving the second circuit breaker to a connecting position or a breaking position; and
   a second cable socket electrically connected to the second circuit breaker, and having a socket portion electrically connected to a load side cable.

9. The solid insulated switchgear of claim 8, wherein the feeder unit further comprises:
   a second lightning arrestor socket electrically connected to the second cable socket; and
   a second lightning arrestor having one end electrically connected to the second lightning arrestor socket, and another end grounded.

10. The solid insulated switchgear of claim 8, wherein the feeder unit further comprises a second connector for electrically connecting the second circuit breaker and the second cable socket,
    wherein the second cable socket comprises:
    a conductor portion; and
    a mold casing portion formed of an insulating solid material for insulating the conductor portion from outside,
    in which the conductor portion comprises:
    a protruding connector formed of a conductive material connected to the second connector;
    a central concave connector electrically connected to the protruding connector, and formed of a conductive material electrically connected to a conductor of the cable; and
    a concave connector disposed at a facing side of the protruding connector so as to be additionally connected to another socket, and electrically connected to the central concave connector.

11. The solid insulated switchgear of claim 10, wherein a thread portion is provided at the central concave connector of the second cable socket connected to the conductor of the cable, and is engaged with a corresponding thread portion provided at an end of the cable.

12. The solid insulated switchgear of claim 9, wherein the second lightning arrestor socket comprises:
    a conductor portion; and
    a mold casing portion formed of an insulating solid material for insulating the conductor portion from outside,
    in which the conductor portion comprises:
    a protruding connector formed of a conductive material;
    a central concave connector electrically connected to the second lightning arrestor, and formed of a conductive material electrically connected to the protruding connector; and
    a concave connector disposed at a facing side of the protruding connector, and formed of a conductive material so as to be connected to another socket.

13. The solid insulated switchgear of claim 12, wherein a thread portion is provided at the central concave connector of the second lightning arrestor socket connected to the conductor of the second lightning arrestor, and is connected to a corresponding thread portion provided at an end of the second lightning arrestor.

14. The solid insulated switchgear of claim 1, further comprising a measuring unit for measuring each potential of the first and second main buses, wherein the measuring unit comprises:
    a fifth main bus connection portion to which the first main bus is connected;
    a sixth main bus connection portion to which the second main bus is connected;
    a fifth disconnection switch and a sixth disconnection switch respectively connected to the fifth main bus connection portion and the sixth main bus connection portion, and each having parts interchangeable with the parts of the first disconnection switch; and
    a potential transformer electrically connected to the fifth and sixth disconnection switches, for measuring a electrical potential between the first main bus and a load side and between the second main bus and the load side.

15. The solid insulated switchgear of claim 1, further comprising a section unit for separating at least one of the first and second main buses from the circuit, wherein the section unit comprises:
    a seventh main bus connection portion connected to one of the first and second main buses;
    a seventh disconnection switch electrically connected to or separated from the seventh main bus connection portion, and having parts interchangeable with the parts of the first disconnection switch;
    a third ground switch electrically connected to the seventh disconnection switch, having parts interchangeable with the parts of the first disconnection switch, and switchable to a grounded position or a position separated from ground, in which a part corresponding to the fixed contactor of the first disconnection switch is connected to ground;

a third circuit breaker electrically connected to the seventh disconnection switch, for connecting or breaking the conducting path from the seventh disconnection switch;
a third driving mechanism for driving the third circuit breaker to a connecting position or a breaking position;
an eighth main bus connection portion electrically connected to the third circuit breaker;
a ninth main bus connection portion connected to one of the first and second main buses, the one to which the seventh disconnection switch is connected;
an eighth disconnection switch electrically connected to or separated from the ninth main bus connection portion, and having parts interchangeable with the parts of the first disconnection switch;
a fourth ground switch electrically connected to the eighth disconnection switch, having parts interchangeable with the parts of the first disconnection switch, and switchable to a grounded position and a position separated from ground, in which a part corresponding to the fixed contactor of the first disconnection switch is connected to ground; and
a tenth main bus connection portion electrically connected to the eighth disconnection switch, and electrically connected to the eighth main bus connection portion.

16. The solid insulated switchgear of claim 1, further comprising a tie unit for connecting the first main bus and the second main bus, wherein the tie unit comprises:
an eleventh main bus connection portion connected to one of the first and second main buses;
a ninth disconnection switch electrically connected to or separated from the eleventh main bus connection portion, and having parts interchangeable with the parts of the first disconnection switch;
a fifth ground switch electrically connected to the ninth disconnection switch, having parts interchangeable with the parts of the first disconnection switch, and switchable to a grounded position and a position separated from ground, in which parts corresponding to the fixed contactor of the first disconnection switch is connected to ground;
a fourth circuit breaker electrically connected to the ninth disconnection switch, for connecting or breaking the circuit from the ninth disconnection switch;
a fourth driving mechanism for driving the fourth circuit breaker to a connecting position or a breaking position;
a twelfth main bus connection portion electrically connected to the fourth circuit breaker;
a thirteenth main bus connection portion connected to one of the first and second main buses, the one to which the eleventh disconnection switch is not connected;
a tenth disconnection switch electrically connected to or separated from the thirteenth main bus connection portion, and having parts interchangeable with the parts of the first disconnection switch;
a sixth ground switch electrically connected to the tenth disconnection switch, having parts interchangeable with the parts of the first disconnection switch, and switchable to a grounded position and a position separated from ground, in which a part corresponding to the fixed contactor of the first disconnection switch is connected to ground; and
a fourteenth main bus connection portion electrically connected to the sixth ground switch, and electrically connected to the twelfth main bus connection portion.

* * * * *